US012676400B2

(12) United States Patent
Yoshino et al.

(10) Patent No.: US 12,676,400 B2
(45) Date of Patent: Jul. 7, 2026

(54) ANTENNA DEVICE, RECTIFIER CIRCUIT, POWER SUPPLY DEVICE, AND ELECTRONIC DEVICE

(71) Applicant: SONY SEMICONDUCTOR SOLUTIONS CORPORATION, Kanagawa (JP)

(72) Inventors: Yoshitaka Yoshino, Tokyo (JP); Taihei Satou, Chiba (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 593 days.

(21) Appl. No.: 18/001,683

(22) PCT Filed: Apr. 28, 2021

(86) PCT No.: PCT/JP2021/016922
§ 371 (c)(1),
(2) Date: Dec. 13, 2022

(87) PCT Pub. No.: WO2021/261075
PCT Pub. Date: Dec. 30, 2021

(65) Prior Publication Data
US 2023/0299465 A1     Sep. 21, 2023

(30) Foreign Application Priority Data

Jun. 22, 2020     (JP) ................................. 2020-107198

(51) Int. Cl.
*H01Q 1/38*          (2006.01)
*H01Q 1/24*          (2006.01)
(Continued)

(52) U.S. Cl.
CPC .............. *H01Q 1/243* (2013.01); *H01Q 1/50* (2013.01); *H01Q 23/00* (2013.01); *H02M 7/064* (2013.01)

(58) Field of Classification Search
CPC ............ H01Q 1/38; H01Q 1/50; H01Q 1/243; H01Q 1/248; H01Q 1/273; H01Q 1/364; H01Q 9/285; H01Q 23/00
See application file for complete search history.

(56) References Cited

U.S. PATENT DOCUMENTS 2,209,845  A  *   7/1940  Overholt, Jr. .......... A63H 19/24
                                                            361/170
3,648,122  A  *   3/1972  Berglund ............... H10N 70/00
                                                            257/30
(Continued)

FOREIGN PATENT DOCUMENTS

EP          1263114        12/2002
JP          S49-23504      6/1974
(Continued)

OTHER PUBLICATIONS

International Search Report and Written Opinion prepared by the Japan Patent Office on Jun. 14, 2021, for International Application No. PCT/JP2021/016922, 2 pgs.

*Primary Examiner* — Tung X Le

(74) *Attorney, Agent, or Firm* — SHERIDAN ROSS P.C.

(57)          ABSTRACT

Provided is an antenna device including an antenna unit including a rectifier circuit that receives electric field energy of a radio wave and a quasi-electrostatic field in a space and rectifies an AC signal into a direct current, the antenna unit including a first antenna element used in contact with a human body and a second antenna element that is a conductor different from the first antenna element and provided not to be in contact with the human body in a state where the human body is not grounded to a ground that is earth, in which an input line output to the rectifier circuit from the first antenna element used in contact with the human body (Continued)

of the AC signal output from the antenna unit is connected in series to the rectifier circuit.

20 Claims, 34 Drawing Sheets

(51) Int. Cl.
| | |
|---|---|
| *H01Q 1/50* | (2006.01) |
| *H01Q 23/00* | (2006.01) |
| *H02M 7/06* | (2006.01) |

(56) References Cited

U.S. PATENT DOCUMENTS

| | | | | |
|---|---|---|---|---|
| 7,307,589 | B1 * | 12/2007 | Gregoire | ............... H01Q 1/248 |
| | | | | 343/700 MS |
| 7,782,255 | B2 * | 8/2010 | Sego | ................. H01Q 21/0025 |
| | | | | 342/372 |
| 8,115,683 | B1 * | 2/2012 | Stefanakos | .......... H10F 77/143 |
| | | | | 136/255 |

| | | | | |
|---|---|---|---|---|
| 9,966,656 | B1 * | 5/2018 | Carter | .................... H01Q 5/371 |
| 10,854,960 | B2 * | 12/2020 | Bean | .................... H02J 50/001 |
| 11,133,576 | B2 * | 9/2021 | Carter | .................. H01Q 9/0421 |
| 2002/0075189 | A1 * | 6/2002 | Carillo, Jr. | ............ H01Q 9/285 |
| | | | | 343/702 |
| 2002/0190689 | A1 | 12/2002 | Nakamura et al. | |
| 2010/0253481 | A1 * | 10/2010 | Zand | ........................ G01S 5/14 |
| | | | | 340/10.3 |
| 2014/0172374 | A1 * | 6/2014 | Brady | ............... G01N 21/3581 |
| | | | | 250/341.8 |
| 2018/0178020 | A1 * | 6/2018 | Perryman | ............ A61N 1/3787 |
| 2019/0107566 | A1 * | 4/2019 | Lachica | ............ G01R 29/0892 |

FOREIGN PATENT DOCUMENTS

| | | |
|---|---|---|
| JP | 2003-088005 | 3/2003 |
| JP | 2013-175607 | 9/2013 |
| JP | 2014183728 A | 9/2014 |
| KR | 20070021947 A | 2/2007 |
| KR | 20150139110 A | 12/2015 |

* cited by examiner

_FIG. 2A_
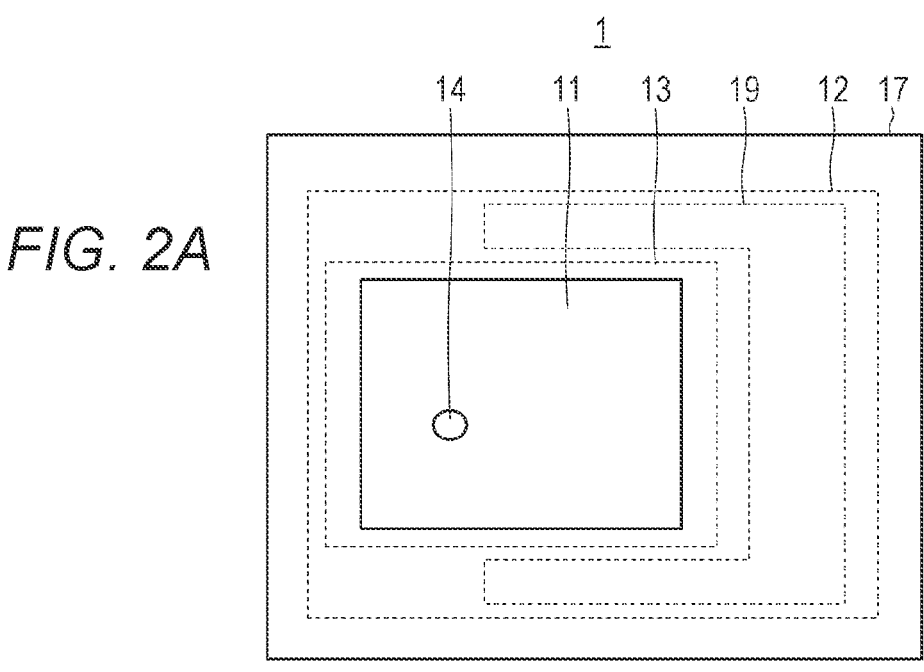
_FIG. 2B_
_FIG. 2C_
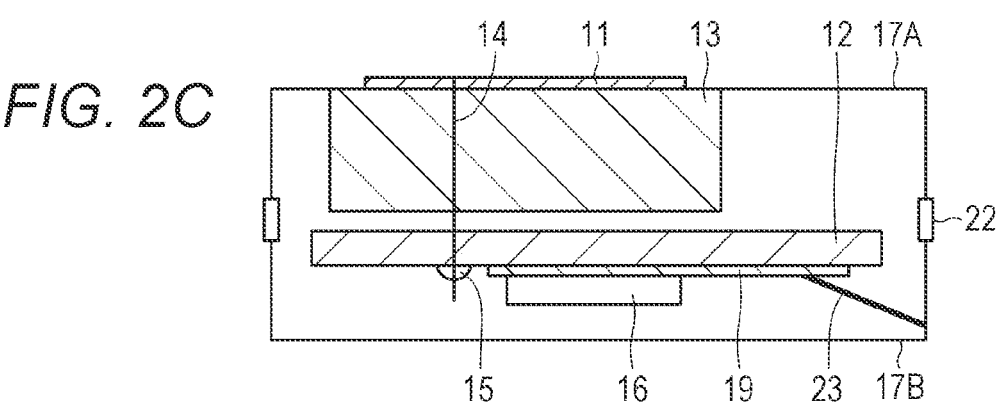

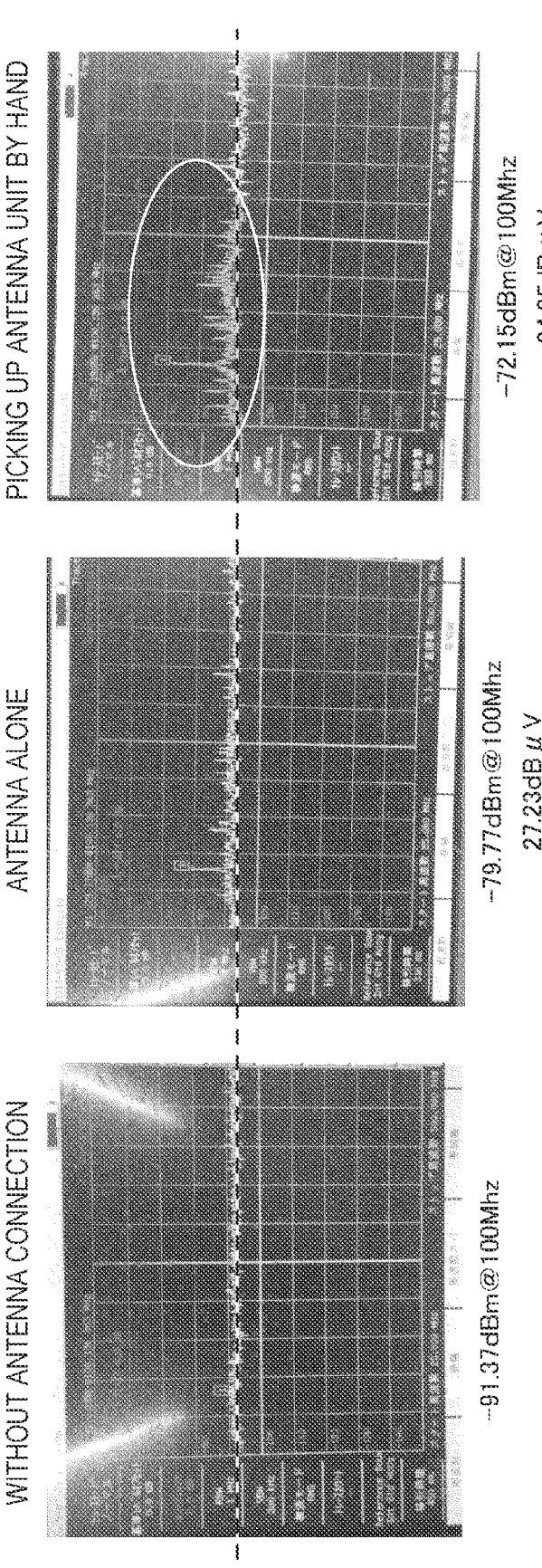
*FIG. 11A*
*FIG. 11B*
*FIG. 11C*
WITHOUT ANTENNA CONNECTION
−91.37dBm@100Mhz
ANTENNA ALONE
−79.77dBm@100Mhz
27.23dB μV
PICKING UP ANTENNA UNIT BY HAND
−72.15dBm@100Mhz
34.85dB μV FREQUENCY (50MHz TO 1GHz)

FREQUENCY (50MHz TO 1GHz)

HUMAN BODY

HUMAN BODY

ANTENNA DEVICE, RECTIFIER CIRCUIT, POWER SUPPLY DEVICE, AND ELECTRONIC DEVICE

CROSS REFERENCE TO RELATED APPLICATIONS

This application is a national stage application under 35 U.S.C. 371 and claims the benefit of PCT Application No. PCT/JP2021/016922, having an international filing date of 28 Apr. 2021, which designated the United States, which PCT application claimed the benefit of Japanese Patent Application No. 2020-107198, filed 22 Jun. 2020, the entire disclosures of each of which are incorporated herein by reference.

TECHNICAL FIELD

The present technology relates to an antenna device, a rectifier circuit, a power supply device, and an electronic device having an energy harvesting function.

BACKGROUND ART

Converting energy of radio waves such as broadcast waves and the like present around us into power (energy harvesting) has been considered. In conventional energy harvesting using radio waves, in order to take in power in space, an antenna is formed in accordance with a frequency of a radio wave to be received, and a rectifier circuit is connected to the antenna to store energy. In this method, an antenna adapted to each frequency to be received is required, and power that can be taken in as energy is limited.

Patent Document 1 describes that a human body functions as an antenna or a ground to take in energy of radio waves from space.

There is described a method of providing an input terminal portion for taking in electromagnetic energy of a radio wave that contacts a human body and propagates in the air through the human body, rectifying power of an AC waveform input from the input terminal, converting the power into a DC waveform, and charging a storage battery as the power. A matching unit for impedance matching with an antenna is provided between the input terminal and the rectifier circuit, and includes a resistor, a capacitor, an inductor, and the like.

CITATION LIST

Patent Document

Patent Document 1: JP 2003-088005 A

SUMMARY OF THE INVENTION

Problems to be Solved by the Invention

The problem of Patent Document 1 is that only electromagnetic energy of radio waves propagating in the air is targeted, and a matching unit for matching impedance with an antenna including a human body is provided, so that power that can be received is significantly reduced. From the experimental result in Patent Document 1, only about 100 μV at the maximum can be obtained in one minute, and the application range is very limited. The present technology solves such a problem.

In the present technology, since the human body is compatible with a wide frequency in connection with a rectifier circuit at a subsequent stage, a matching circuit is not provided in an input terminal portion in contact with the human body for using the human body as an antenna, connection is made in series, and rectification is performed with a diode having a very small reverse current with respect to a forward current. Therefore, in addition to conventional radio waves, power of several Hz that is an electric field generated when a very small person walks or power of a quasi-electrostatic field (near field) that is not a radio wave such as 50/60 Hz leaking from a power supply can be efficiently received as a frequency. That is, it is not necessary to consider the antenna shape between the input terminal portion connected to the human body and the rectifier circuit, and the matching circuit is unnecessary. Therefore, by adopting a structure in which the ground of the antenna device or another antenna element forms an electric field with the ground of the earth by capacitor coupling, it is possible to take in electric field energy in a quasi-electrostatic field other than radio waves. That is, power or noise leaking from a power cord or an inverter can be received and converted into energy. That is, since a wide range of electric field energy can be received, reception power can be increased. The quasi-electrostatic field is a voltage phenomenon that does not have a property of propagating like a radiated electromagnetic field, a so-called radio wave, and is distributed like electrostatic charging in the vicinity of a person, a vehicle, or a substance. The electrostatic field is regarded as having no time change, whereas the quasi-electrostatic field has a frequency component and has a time change.

Thus, an object of the present technology is to provide an antenna device, a rectifier circuit, a power supply device, and an electronic device capable of obtaining larger reception power by taking in electric field energy of a quasi-electrostatic field (near field) in addition to a wide range of radio waves with a configuration different from conventional one of converting energy of radio waves into power using a human body.

Solutions to Problems

The present technology provides an antenna device including an antenna unit including a rectifier circuit that receives electric field energy of a radio wave or a quasi-electrostatic field in a space and rectifies an AC signal into a direct current, the antenna unit including a first antenna element that is a conductor to be used in contact with a human body and a second antenna element that is a conductor different from the first antenna element and provided not to be in contact with the human body in a state where the human body is not grounded to a ground that is earth, in which an input line output to the rectifier circuit from the first antenna element used in contact with the human body of the AC signal output from the antenna unit is connected in series to the rectifier circuit without a matching circuit or the like.

BRIEF DESCRIPTION OF DRAWINGS

FIGS. 2A, 2B, and 2C are a plan view and cross-sectional views of an antenna device included in the reception device.

FIG. 3 is a schematic diagram for explaining an example of the antenna device including a device board.

FIG. 4 is a schematic diagram for explaining another example of the antenna device including the device board.

FIGS. 11A, 11B, and 11C are graphs illustrating measurement results of output according to an embodiment.

FIGS. 13A and 13B are graphs illustrating measurement results of peak gain measurement according to an embodiment.

MODE FOR CARRYING OUT THE INVENTION

Figure 1:
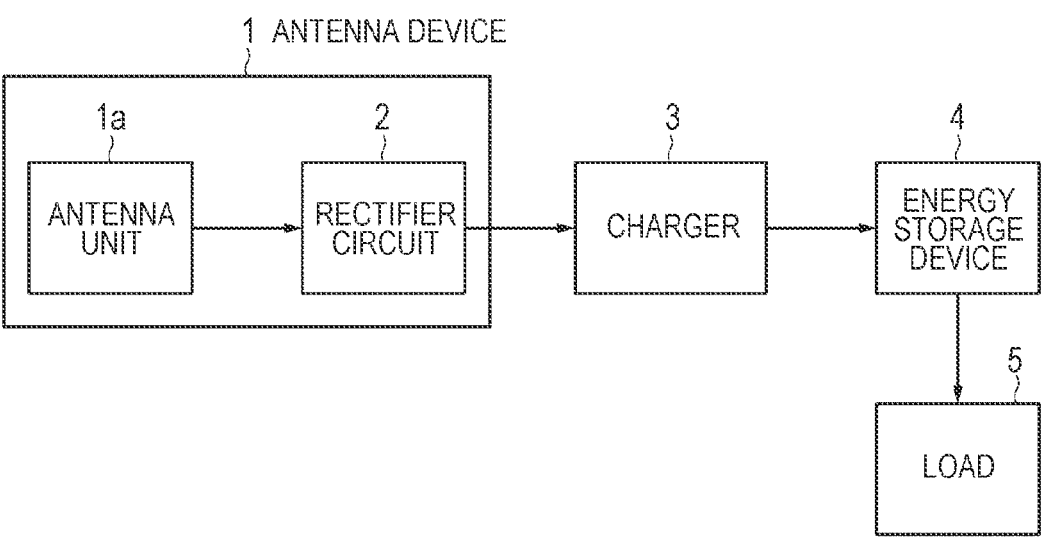
FIG. 1 is a block diagram of an embodiment of a reception device according to the present technology.

The embodiments described below are preferred specific examples of the present technology, and various technically preferable limitations are given. However, the scope of the present technology is not limited to these embodiments unless there is a description to limit the present technology in the following description. Furthermore, in the following description, the same names and reference numerals indicate the same or similar constituent elements, and redundant description will be omitted as appropriate.

FIG. 1 illustrates an embodiment of an antenna device having an energy harvesting function according to the present technology. The electric field energy is received by an antenna unit 1a including a first antenna element and a second antenna element, and the output of the antenna unit 1a is supplied to a rectifier circuit 2. The antenna unit 1a and the rectifier circuit 2 constitute an antenna device 1.

The output of the rectifier circuit 2 is supplied to a charger 3. An energy storage device 4 is connected to the charger 3. The energy storage device 4 is charged by the charger 3. The charger 3 may control the discharge of the energy storage device 4. The antenna device 1, the charger 3, and the energy storage device 4 constitute a reception device. A load 5 is connected to the energy storage device 4. The load 5 is operated by the power stored in the energy storage device 4. The load 5 is, for example, a microcomputer, a wireless communication unit, a sensor, or the like. The output of the sensor is wirelessly transmitted under the control of the microcomputer.

The antenna device 1 includes a first antenna element that is in contact with a human body and a second antenna element. The antenna device will be described with reference to FIG. 2A (plan view), 2B (cross-sectional view), and 2C (cross-sectional view) in which an antenna element 11 as the first antenna element is configured in a plate shape (patch shape), and a board diagram (FIG. 3) on which the rectifier circuit 2 (described later) is mounted. As illustrated in FIGS. 2A, 2B, and 2C, the antenna element 11 as the contact portion has a plate shape including a conductor such as gold, silver, aluminum, copper, iron, nickel, an alloy, or the like. Furthermore, the antenna element 11 is a conductor, and may pass electricity, such as conductive resin or conductive rubber mixed with carbon, metal, or the like. For example, by using gold or silver, a low-resistance electrode can be made. Further, the cost of the antenna element 11 can be suppressed by using aluminum, copper, iron, nickel, or the like. Further, by using these metals and alloys with other metals, it is possible to appropriately configure a lightweight electrode, a highly durable electrode, and the like.

Further, as the antenna element 11, for example, a conductive resin, a conductive rubber, or the like in which carbon, metal, or the like is blended may be used. By using the conductive resin, for example, electrodes of various shapes can be easily formed. Further, by using the conductive rubber, an electrode that can be elastically deformed, an electrode having high adhesion, and the like can be configured.

In addition, the material of the antenna element 11 is not limited, and the materials described above may be used alone, or the electrodes may be configured by combining the respective materials.

Further, the antenna element 11 may be configured such that a conductor constituting an electrode is in direct contact with the human body, or a surface in contact with the human body may be coated with resin. For the coating, for example, a resin having water resistance such as waterproof and drip-proof and weather resistance to ultraviolet rays and the like is used. Therefore, a situation in which the antenna element 11 corrodes in a case of being used outdoors, in a pool, or the like is avoided. In addition, it is possible to protect the antenna element 11 from sweat, moisture, and the like generated in a case where the user exercises.

In FIGS. 2B and 2C, for example, the plate-like (patch-like) antenna element 11 and a device board (circuit board) 12 are disposed to face each other, and a dielectric plate 13 is interposed between the antenna element 11 and the device board 12. The space between the antenna element 11 and the device board 12 may be formed without providing the dielectric plate 13.

In order to electrically connect the antenna element 11 and the device board 12, one end of the antenna element 11 and one end of the conductive pin 14 are electrically connected, and the other end of a conductive pin 14 penetrates the device board 12 and is soldered to the signal path electrode on the back surface of the device board 12. The antenna element 11 and a ground including a copper foil pattern of the device board 12 constitute the antenna unit 1a. The ground is the second antenna element.

A connection portion between the signal path electrode of the device board 12 and the conductive pin 14 serves as a feeding point 15 of the antenna. A circuit unit 16 is provided on, for example, the back surface of the device board 12. The circuit unit 16 includes the rectifier circuit 2. The rectifier circuit 2 does not overlap the ground 19 including the copper foil pattern of the device board 12. The charger 3 and the energy storage device 4 (not illustrated) may be included in the circuit unit 16, or may be provided separately.

The antenna device having the above-described configuration is housed in a case 17. The contact surface of the case 17 to the human body other than the antenna element 11 includes an insulating material such as resin. Furthermore, the case side surface, the case opposite surface, and the like other than the contact surface with the human body also include an insulating material.

FIG. 2C illustrates a configuration in which the case 17 includes a case 17A including a non-metal such as resin or the like and a case 17B including a metal. The ground 19 on either the upper or lower surface of the device board 12 and the case 17B may be electrically connected to each other. That is, the case 17A including an insulating material on which the antenna element 11 is provided and the case 17B including a metal material constituting the opposite surface may be connected by a connection unit 22 such as a screw, and the case 17B and the ground 19 of the device board 12 may be connected by a wire 23.

Figure 3:
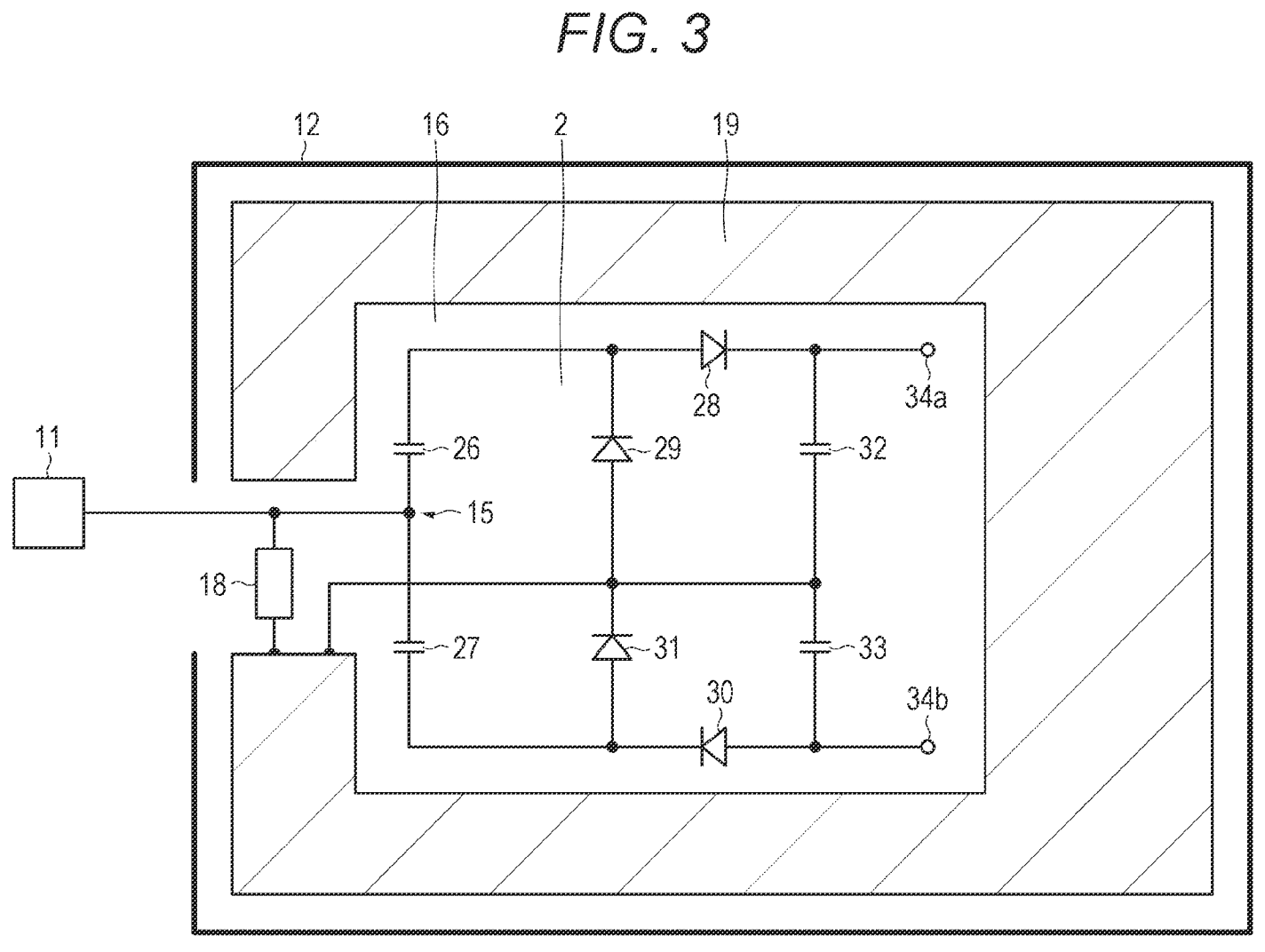

As illustrated in FIG. 3, the ground 19 including the copper foil pattern is formed on the circuit board 12, and the antenna element 11 and the ground 19 including the copper foil pattern of the device board 12 constitute the antenna unit 1a. The ground 19 is the second antenna element. Furthermore, as an electrostatic countermeasure, an electrostatic protection component, for example, a varistor 18 is inserted between the antenna element 11 in contact with or connected to the human body and the ground including the copper foil pattern of the reception device. Note that the varistor 18 may be connected between an output terminal 34a and the ground 19.

The circuit unit 16 includes the rectifier circuit 2. The rectifier circuit 2 does not overlap the ground 19 including the copper foil pattern of the device board 12. An input line output from the antenna element 11 to the rectifier circuit 2 is connected in series to the rectifier circuit without interposing a matching circuit. The charger 3 and the energy storage device 4 (not illustrated) may be included in the circuit unit 16, or may be provided separately.

Figure 4:
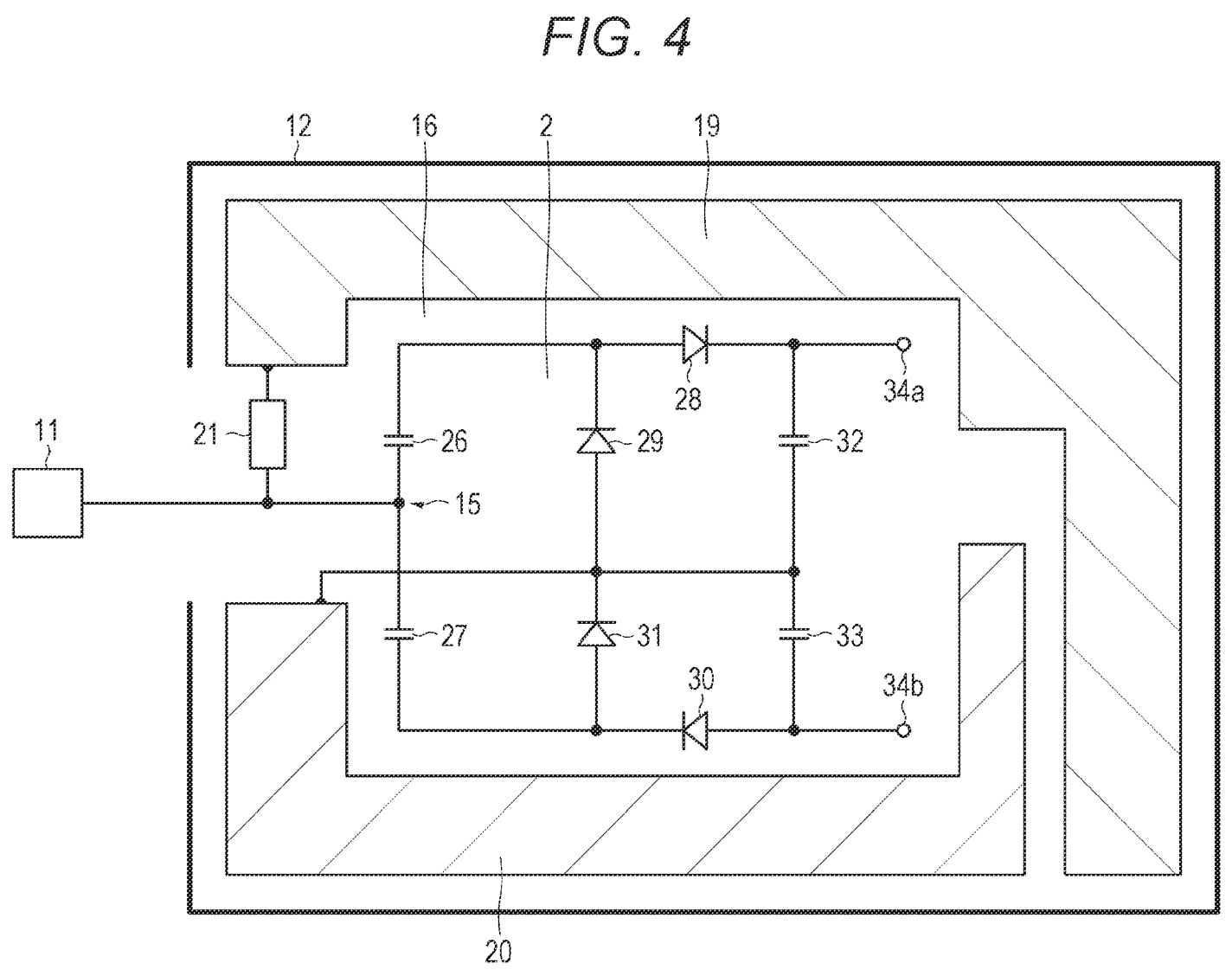

Next, as illustrated in FIG. 4, a separate second antenna element 20 (illustrated as a shaded region) including a copper foil pattern may be made on the board described above. In this case, the separate second antenna element 20 needs not to come into contact with the human body. Furthermore, in FIG. 4, it is formed on a separate board, but it may be formed on a metal portion such as a housing configured not to come into contact with the human body on the opposite side of the human body of the receiver. Also in this case, as an electrostatic countermeasure, an electrostatic protection component such as a varistor 21, for example, can be inserted between the antenna element 11 in contact with the human body and the ground of the reception device.

Figure 5A:
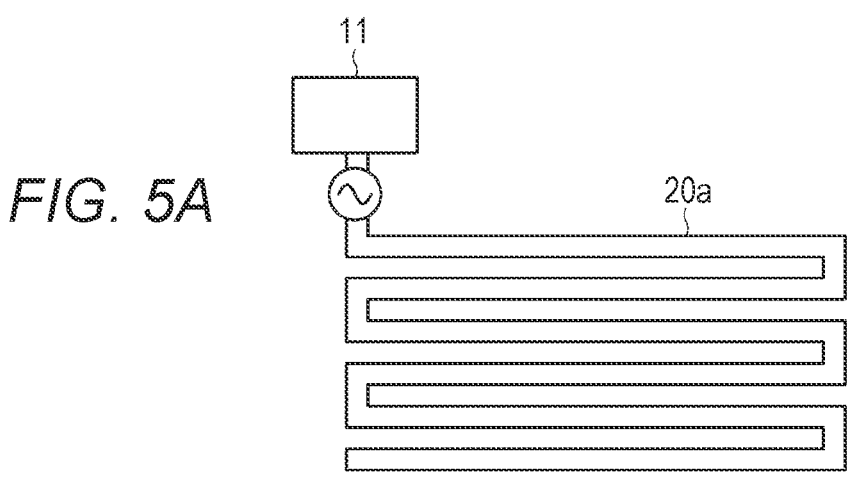
FIGS. 5A, 5B, and 5C are schematic diagrams illustrating specific examples of a second antenna element.
Figure 5B:
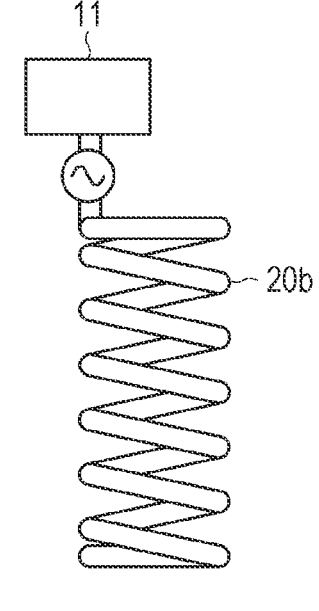
Figure 5C:
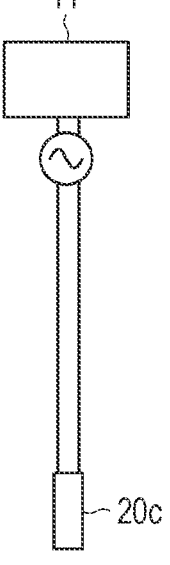

Other configurations of the second antenna element 20 are illustrated in FIG. 5. FIG. 5A illustrates a configuration of a meander line 20a, and FIG. 5B illustrates a configuration of a coil 20b, which may be a configuration of a chip coil. FIG. 5C illustrates a configuration in which an inductor 20c is provided at the tip portion. These configurations can reduce the footprint, increase the antenna length, and increase the induced voltage.

There is a great deal of electric field energy around us, which can be divided into low frequency components and high frequency components. For example, a leakage electric field (50 Hz/60 Hz) from a home AC power supply, noise present in the vicinity of a personal computer, a voltage generated when a person walks, and the like are low frequency components. These are referred to as quasi-electrostatic fields (near field). On the other hand, radio broadcasting (AM/FM), television broadcasting, mobile phone radio waves, and the like are high frequency components. These are referred to as radio waves (far field).

The above-described antenna element 11 of the antenna unit 1a comes into contact with a human body. The antenna element 11 is attached to a part of a human body, for example, an arm. Since the human body is used as an antenna, the antenna device 1 can take in energy of both a quasi-electrostatic field such as noise which is a leakage current and a radio wave such as a broadcast wave.

As illustrated in FIG. 5A, the human body and the antenna element 11 are electrically in contact with each other by capacitive coupling. For the antenna device 1, it is preferable that the antenna element 11 is in direct contact with the human body, and it is basically preferable that the antenna element is in surface contact to increase the capacity. However, the present invention is not limited to surface, and may have a pin structure, a hemispherical structure, or a structure in which fitting is performed with unevenness in addition to a planar shape as long as the structure is in contact with the human body. The antenna device 1 including the antenna element 11 in contact with the human body and the ground electrode of the device board 12, or the separate second antenna element 20 (FIG. 4) can receive electric field energy to generate power.

Furthermore, as illustrated in FIG. 5B, for example, in a state where the antenna device 1 (hatched portion) is attached to the arm, it can be considered that a pseudo ground is formed by capacitive coupling between the ground of the device board 12 or the separate second antenna element 20 (FIG. 4) and the ground of the earth. This antenna device 1 can receive a low frequency quasi-electrostatic field. The reason why the antenna device 1 according to an embodiment of the present technology resonates at a low frequency such as 50 Hz, for example, is considered that the blood vessel appears as an antenna. In this manner, the antenna device 1 includes the antenna configuration of FIG. 3 or 4, and can receive radio waves in a wide frequency range. Thus, the electric field energy can be taken in without being restricted by the place where the person wearing the antenna device according to the present technology is present.

Figures 6A, 6B:
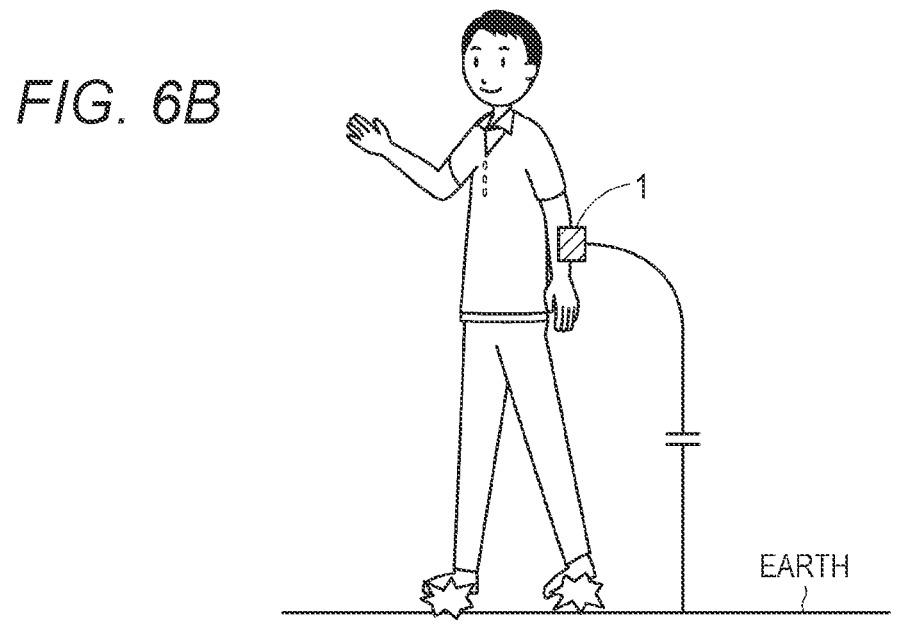
FIGS. 6A and 6B are schematic diagrams for explaining the operation of the antenna device.

An example of the rectifier circuit 2 is illustrated in FIG. 6. In the case of handling a small voltage such as energy harvesting, rectification can be performed by a normal rectifier circuit (not illustrated here), but a certain level of voltage is required in order to store energy quickly. Therefore, like a voltage doubler circuit, it is necessary to boost and rectify. Thus, by inserting a capacitor at a level desired to be boosted into a preceding stage of the diode and performing rectification, a voltage corresponding to the capacitor is added, and boosting can be performed. Therefore, a configuration of a full-wave voltage quadrupler rectifier circuit including input capacitors 26 and 27, diodes 28, 29, 30, and 31, and capacitors 32 and 33 connected to the antenna unit 1*a* is used. Direct current is output from both ends of the series connection of the capacitors 32 and 33 and from output terminals 34*a* and 34*b*. In the present configuration, the capacitors 32 and 33 are portions that actually store the current in addition to the voltage increase, and thus the capacity of this portion is preferably large and the leakage current is preferably small.

Figure 7:
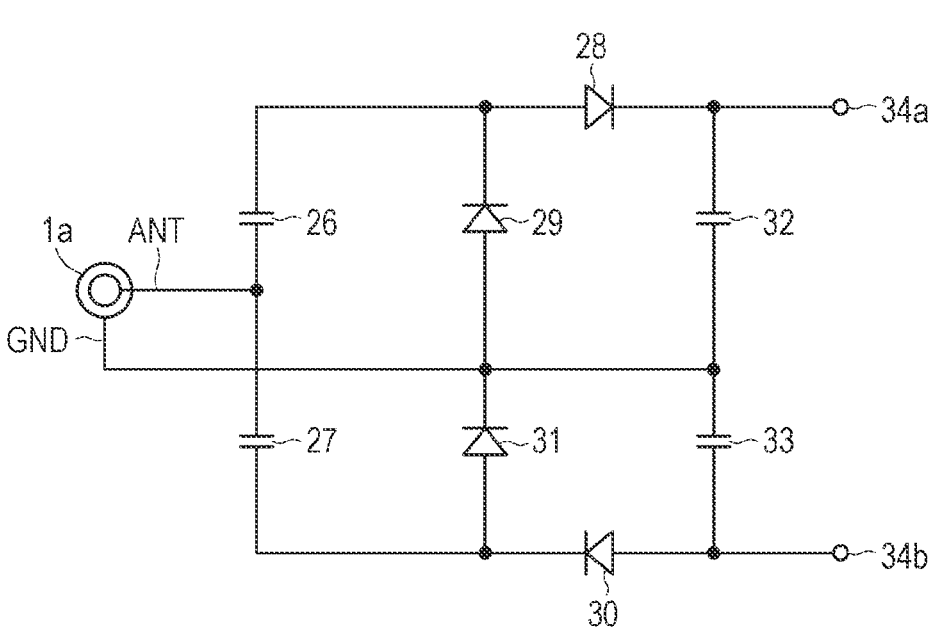
FIG. 7 is a connection diagram illustrating a configuration of an example of a rectifier circuit.

The present example uses a full-wave voltage quadrupler rectifier circuit, but may use a rectifier circuit incorporating a normal half-wave rectifier circuit, full-wave rectifier circuit, voltage doubler rectifier circuit, or Cockcroft-Walton circuit (not illustrated). Furthermore, in terms of efficiency, since the full-wave rectifier circuit can increase the voltage of the AC signal and take in all, the full-wave rectifier circuit has a better result even if the loss of the diode is included with the diode adopted for rectification this time. The configuration of FIG. 7 is two-stage voltage quadrupler rectification, but the number of stages may be further increased in a case where it is desired to increase the extraction voltage.

An example of the value of each element is illustrated below.

Capacitors 26, 27: 0.22 μF, 32, 33: 47 μF
Diodes 28, 29, 30, 31: 1N60 (silicon)

Figure 8:
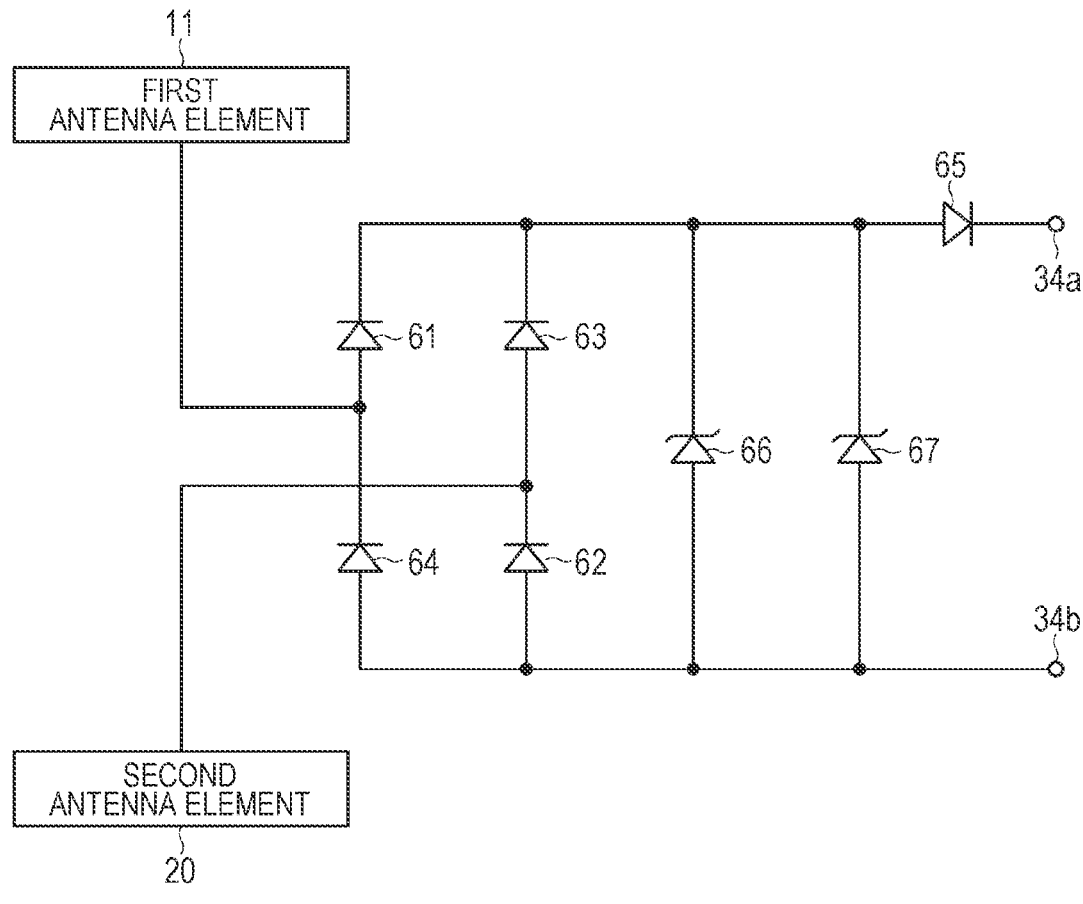
FIG. 8 is a connection diagram illustrating a configuration of another example of the rectifier circuit.

In the case of, for example, a voltage doubler rectifier circuit using a capacitor, it is important that the leakage current of the diode at the time of reverse bias is very small. In a case where there is a leakage current, a full-wave rectifier circuit is suitable. Another example (full-wave rectifier circuit) of the rectifier circuit 2 is illustrated in FIG. 8. As illustrated in FIG. 8, diodes 61 and 64 are connected in series, and diodes 63 and 62 are connected in series. A connection point of an anode of the diode 61 and a cathode of the diode 64 is connected to the first antenna element 11, and a connection point of an anode of the diode 63 and a cathode of the diode 62 is connected to the second antenna element 20. A cathode of the diode 61 and a cathode connection point of the diode 63 are connected to one output terminal 34*a* via a backflow prevention diode 65, and an anode of the diode 64 and an anode connection point of the diode 62 are connected to the other output terminal 34*b*. An electrostatic countermeasure varistor 66 and an IC protection Zener diode 67 (for example, a Zener voltage is 6.5 V) are connected in parallel between the output terminals 34*a* and 34*b*.

Figure 9:
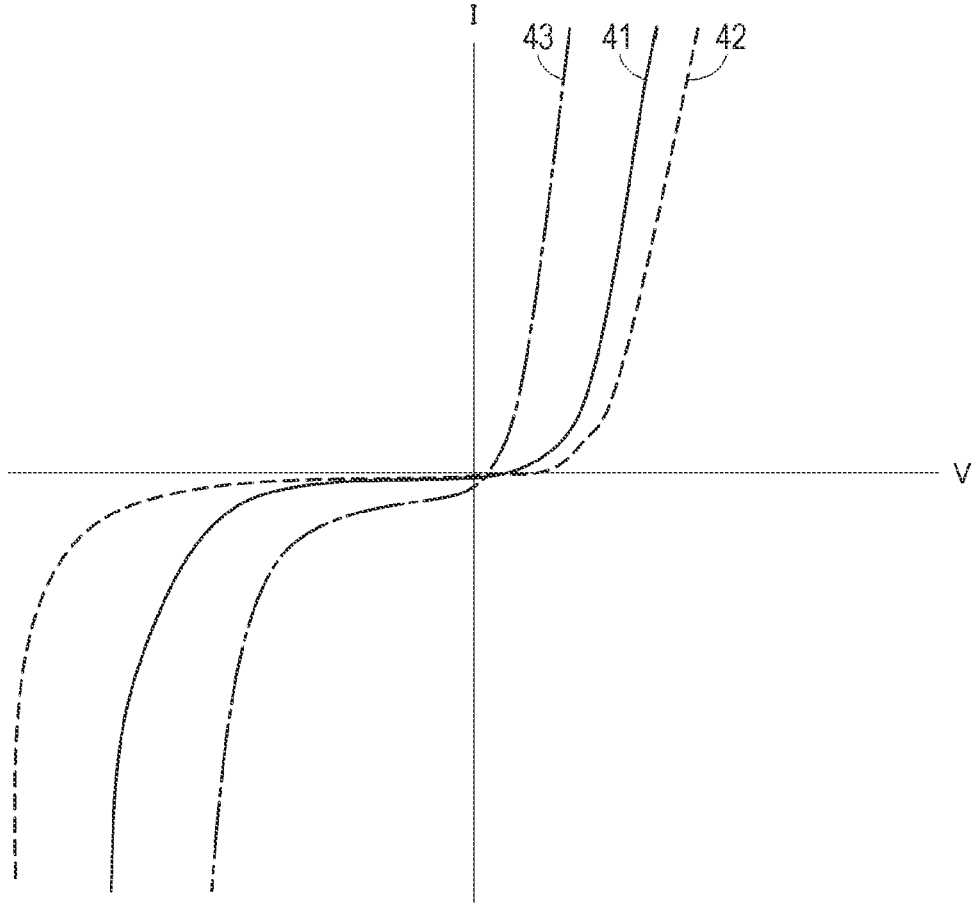
FIG. 9 is a graph for explaining characteristics of a diode of the rectifier circuit.

Note that, although it is configured by a discrete diode, it may be configured by a dedicated IC. FIG. 9 and Table 1 illustrates results of measurement of the forward voltage Vf and the reverse current Is of the diode used in the rectifier circuit 2. The diode product number 1N60 was measured using silicon and germanium products, and the other product number ISS108 was evaluated using germanium products manufactured by different manufacturers. In FIG. 9, a curve 42 is a characteristic of 1N60 (silicon), a curve 41 is a characteristic of 1N60 (germanium), and a curve 43 is a characteristic of ISS108 (germanium).

TABLE 1

| | Room temperature | | Rectification |
|---|---|---|---|
| | Forward voltage Vf [mV] | Reverse current Is [μA] | by human body antenna |
| 1N60 (silicon) | 367 | 1 | ○ |
| 1N60 (germanium) | 303 | 7 | X |
| 1SS108 | 162 | 26 | X |

A current flowing when a voltage is applied in the reverse direction of the diode is the reverse current Is. The measurement data in Table 1 is data when 10 V is added in the reverse direction of the diode. The forward voltage Vf is a voltage at which a forward current (1 mA) starts to flow through the diode.

In a case where the output of the antenna unit 1*a* (device in which the human body is used as an antenna) described above is rectified, it has been found that the diode 1N60 (silicon) in which the current does not flow in the reverse direction can take in power more than the diode in which the voltage at which the current starts to flow in the forward direction is low. The rectified input is an alternating current, and the reverse current Is when the forward voltage Vf of the diode is applied in the reverse direction is data of 10 V in Table 1. Therefore, when the reverse current Is when the same voltage as Vf is applied in the reverse direction is calculated from the data, 1N60 (silicon) is 0.036 μA, 1N60 (germanium) is 0.21 μA, and ISS108 (germanium) is 0.5 μA. Thus, the ratio of forward current (1 mA)/reverse current Is is calculated to be 1/27778 for 1N60 (silicon), 1/4762 for 1N60 (germanium), and 1/2000 for ISS108 (germanium). That is, for the diode used in the rectifier circuit 2, the above-described ratio needs to be larger than about 4700 times, and preferably, the above-described ratio is 10,000 or more. As a result, among the three diodes mentioned as examples, 1N60 (silicon) has the most suitable characteristics.

Moreover, considering the characteristics of the diode, the reverse current Is when applied in the reverse direction is preferably small, and when the reverse resistance value is calculated using data of 10 V, 1N60 (silicon) is 100 MΩ, 1N60 (germanium) is 1.43 MΩ, and ISS108 (germanium) is 0.38 MΩ. That is, the resistance value for preventing the current from flowing in the reverse direction is preferably large, and as the diode used in the rectifier circuit 2, the above-described resistance value needs to be larger than 1.43 MΩ, and is preferably 10 MΩ or more. As a result, among the three diodes mentioned as examples, 1N60 (silicon) has the most suitable characteristics.

Figure 10:
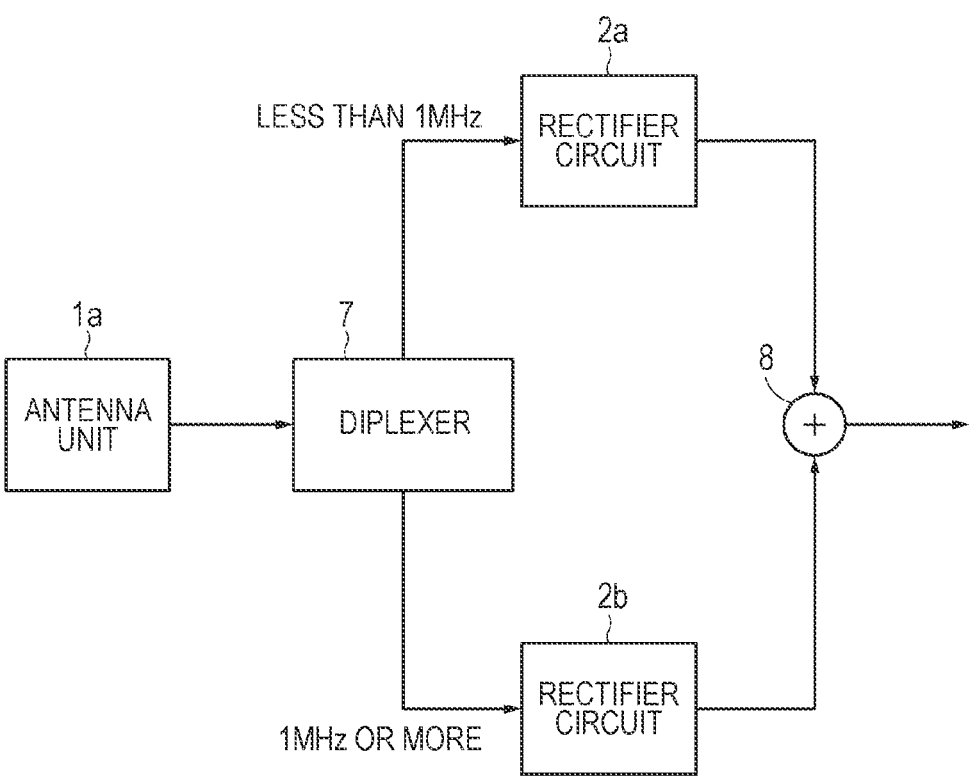
FIG. 10 is a block diagram of a modification of the embodiment.

In consideration of such a difference in characteristics of the diodes, as illustrated in FIG. 10, it is also possible to provide two rectifier circuits 2a and 2b and divide the output of the antenna unit 1a into two frequency components by a diplexer 7. A low frequency component less than a predetermined frequency, for example, less than 1 MHz, divided by the diplexer 7 is supplied to one rectifier circuit 2a and rectified. Furthermore, a high frequency component of a predetermined frequency or more, for example, 1 MHz or more is supplied to the other rectifier circuit 2b and rectified. Outputs of the rectifier circuits 2a and 2b are added by an adder circuit 8 and output.

The rectifying diode constituting the rectifier circuit 2a has a characteristic suitable for rectifying the electric signal generated from the quasi-electrostatic field of the low frequency component, for example, a characteristic in which the reverse current Is at the time of the forward voltage Vf is small, and the rectifying diode constituting the rectifier circuit 2b has a characteristic suitable for rectifying the electric signal generated from the radio wave of the radiated electromagnetic field of the high frequency component, for example, a characteristic in which the forward voltage is low. The diplexer 7 that frequency-separates the output signal of the antenna unit 1a is configured with as little loss as possible. Note that 1 MHz of a predetermined frequency is an example, and may be divided into different frequencies depending on diode frequency characteristics, or the frequency division may be three or more.

FIG. 11 illustrates a waveform of a reception signal obtained in a case where the antenna device according to an embodiment of the present technology is actually operated in a laboratory without a window owned by the applicant. FIGS. 11A, 11B, and 11C are spectra obtained by measuring a reception signal in a frequency range of 25 MHz to 500 MHz with a spectrum analyzer indoors (in a room). FIG. 11A illustrates a reception signal spectrum in a case where the antenna device 1 is not connected, in which the reception level of 100 MHz (indicated by a square mark) is (−91.37 dBm), for example. dBm is a unit represented by a decibel (dB) value with 1 milliwatt (mW) of power as a reference value, and represents the strength of the radio wave. FIG. 11B illustrates a reception signal spectrum in a case of the antenna device 1 alone, in which the reception level at 100 MHz (indicated by a square mark) is (−79.77 dBm, 27.23 dBpV). FIG. 11C illustrates a reception signal spectrum in a case where the antenna device 1 is picked up by hand, in which the reception level at 100 MHz (indicated by a square mark) is (−72.15 dBm, 34.85 dBpV). It can be seen from FIGS. 11A, 11B, and 11C that the largest output signal is obtained in a case where the antenna element 11 of the antenna device 1 is in contact with the human body.

Figure 12A:
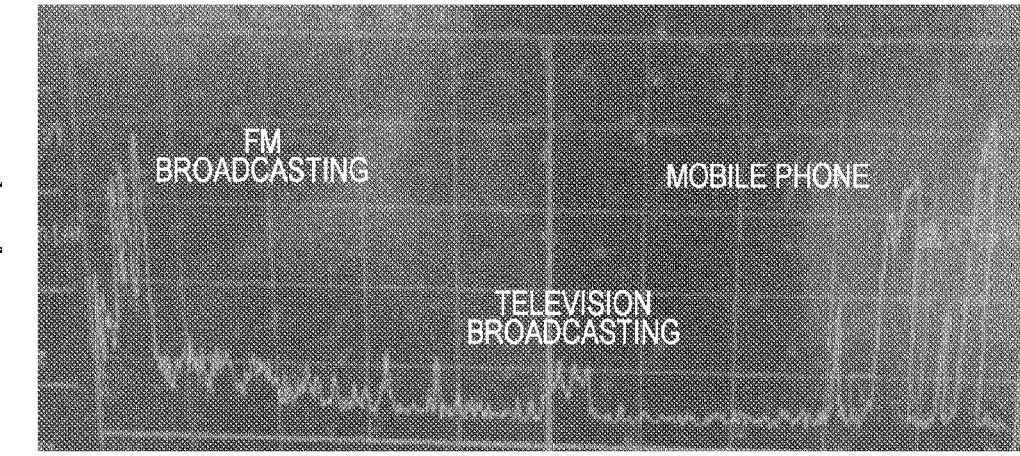
FIGS. 12A and 12B are graphs illustrating measurement results of output according to an embodiment.
Figure 12B:
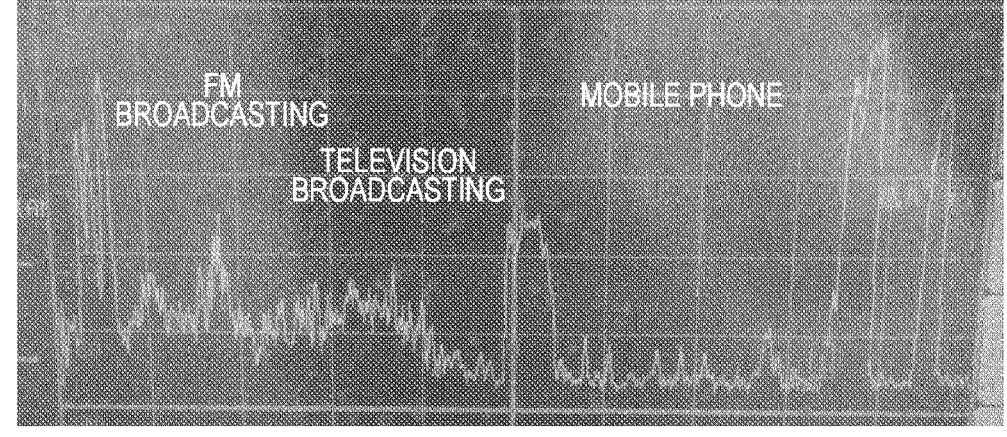

FIGS. 12A and 12B illustrate results of an experiment of actually receiving radio waves of broadcast waves, mobile phones, or the like outdoors. The results are obtained by receiving radio waves outdoors using an antenna device according to an embodiment of the present technology and measuring the radio waves with a spectrum analyzer. FIGS. 12A and 12B are spectra of reception signals in a frequency range of 50 MHz to 1 GHz outdoors. The vertical axis represents the strength (dBm) of the radio wave. FIG. 12A illustrates a reception signal spectrum in a case where the antenna device 1 is used alone, and FIG. 12B illustrates a reception signal spectrum in a case where the antenna element 11 is picked up by hand. The frequency at which a relatively large amplitude is obtained corresponds to frequency bands of FM broadcasting, television broadcasting, and mobile phones. From these experimental results, it can be seen that the reception level greatly increases when the antenna element 11 of the antenna device 1 comes into contact with the human body both indoors and outdoors.

Figures 13A, 13B:
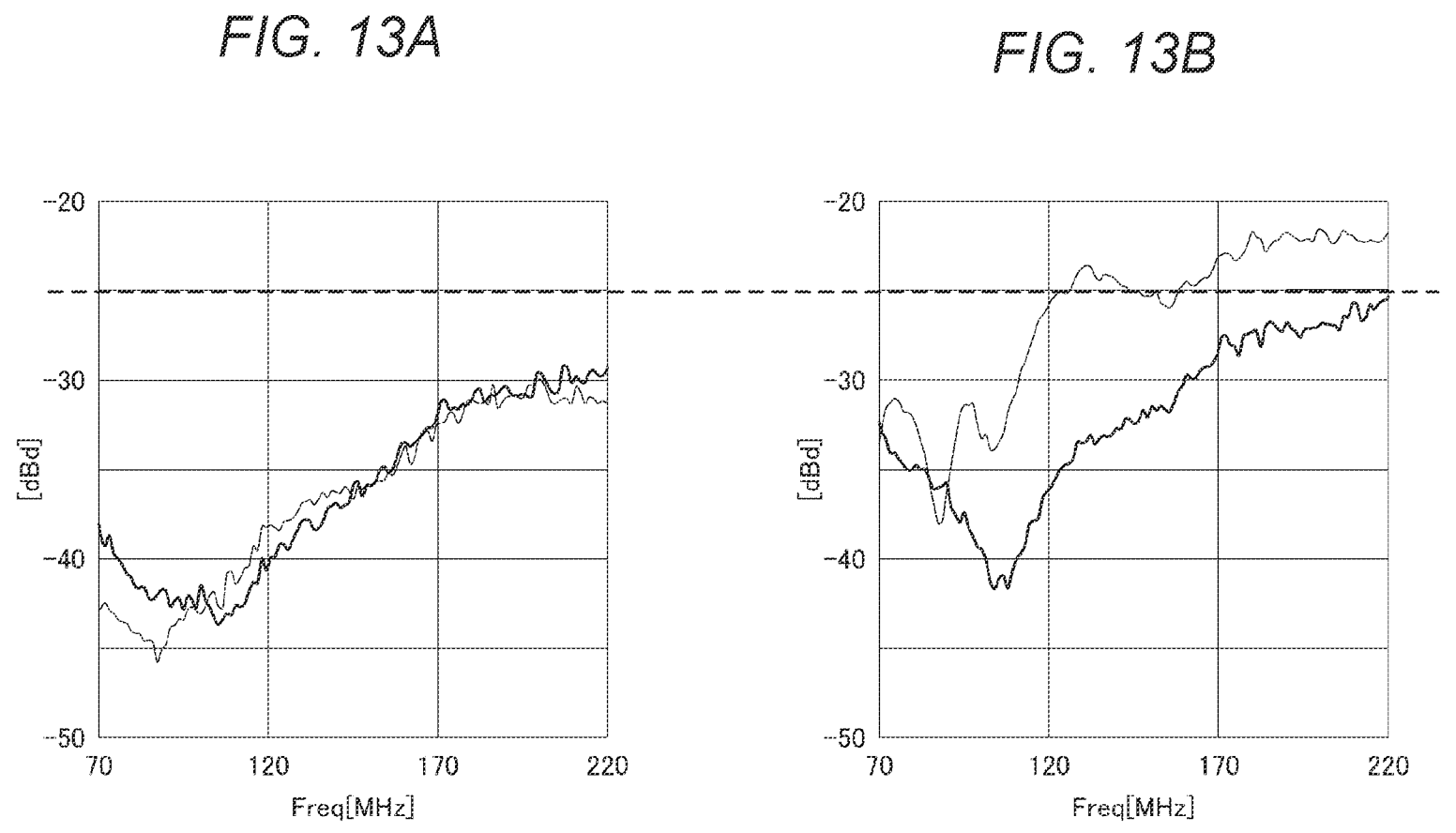
Figures 14A, 14B:
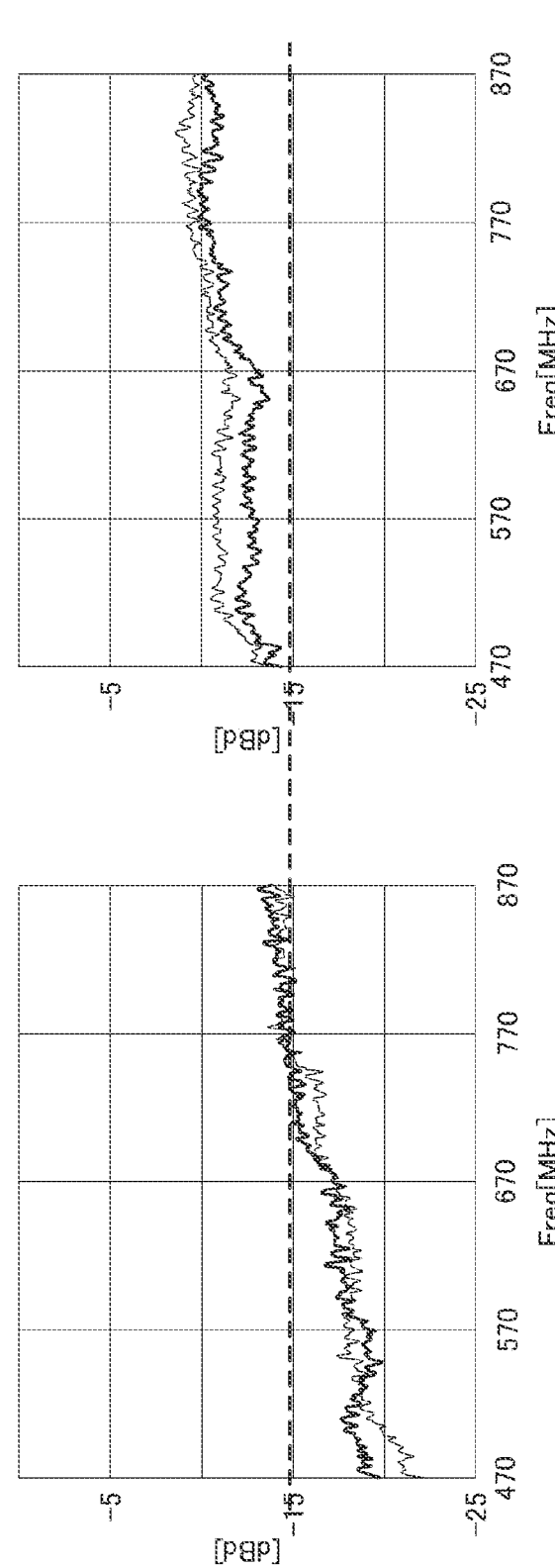
FIGS. 14A and 14B are graphs illustrating measurement results of peak gain measurement according to an embodiment.

Moreover, FIGS. 13A and 13B illustrate measurement results obtained by measuring (peak gain measurement) the same antenna device 1 in an anechoic chamber. The horizontal axis represents frequency, and the vertical axis represents antenna gain (dBd). These measurement results are measurement results in the VHF band of FM broadcasting. FIG. 13A illustrates a measurement result of the antenna alone, and FIG. 13B illustrates a measurement result in a case where the antenna element 11 is brought into contact with a hand. Moreover, FIGS. 14A and 14B are measurement results in the UHF band of television broadcasting, FIG. 14A illustrates a measurement result of the antenna alone, and FIG. 14B illustrates a measurement result in a case where the antenna element 11 is brought into contact with a hand. It can be seen from FIGS. 13A, 13B, 14A, and 14B that the reception gain increases by bringing the antenna element 11 into contact with the human body also in the anechoic chamber. Note that, in these drawings, a thin line indicates a horizontal polarization characteristic, and a solid line indicates a vertical polarization characteristic.

Figure 15:
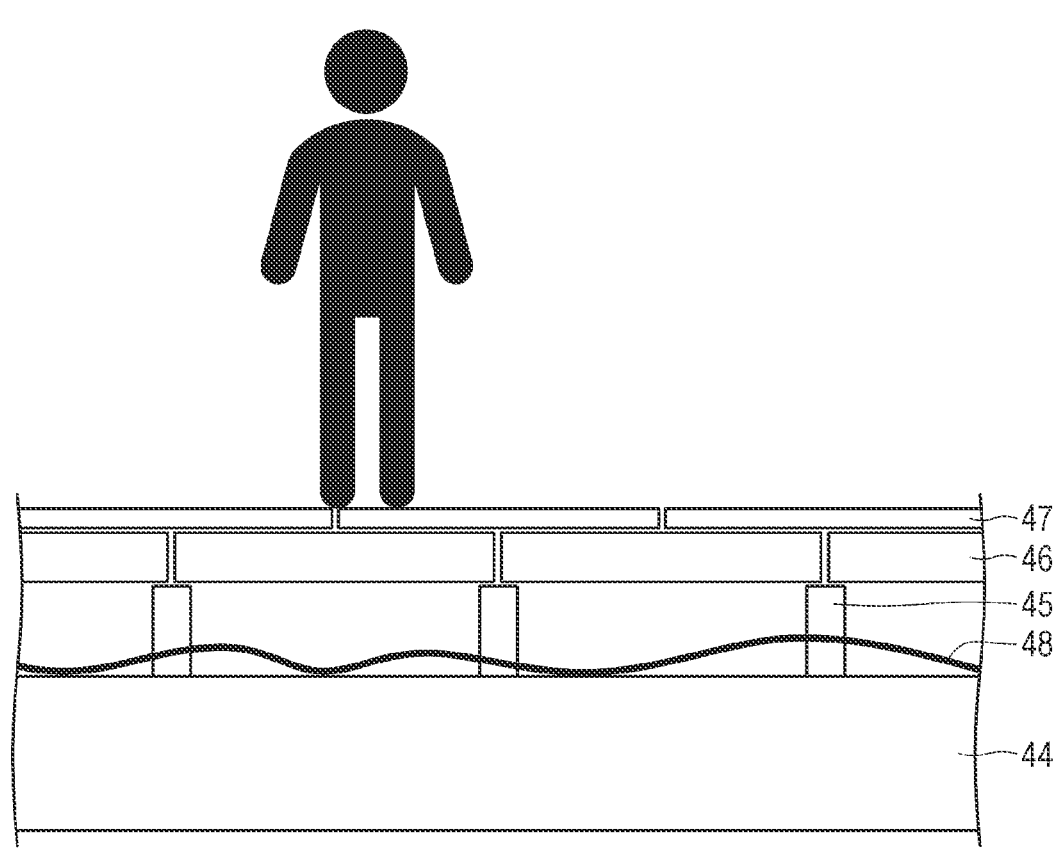
FIG. 15 is a schematic diagram used to describe the operation of an embodiment.

Moreover, FIG. 15 illustrates a floor structure (so-called office automation (OA) floor) in a case where floor wiring is provided. With respect to a reinforced concrete base 44, a floor metal plate 46 is supported by a metal plate support 45, and a floor carpet (for example, tile carpet) 47 is laid on the floor metal plate 46. A power cable 48 is disposed in a space formed between the base 44 and the floor metal plate 46. The power cable 48 meanders up and down. When the antenna element 11 of the antenna device 1 described above was brought into contact with a part of the body of a person on such a floor structure, the power received by the antenna device 1 was measured with an oscilloscope. As a result, the power was about 300 mV (p-p value) at a power supply frequency of 50 Hz. As can be seen from this experiment, the antenna device 1 can also take in considerable power from a leakage electric field (quasi-electrostatic field) from the power cable in the room.

Figure 16:
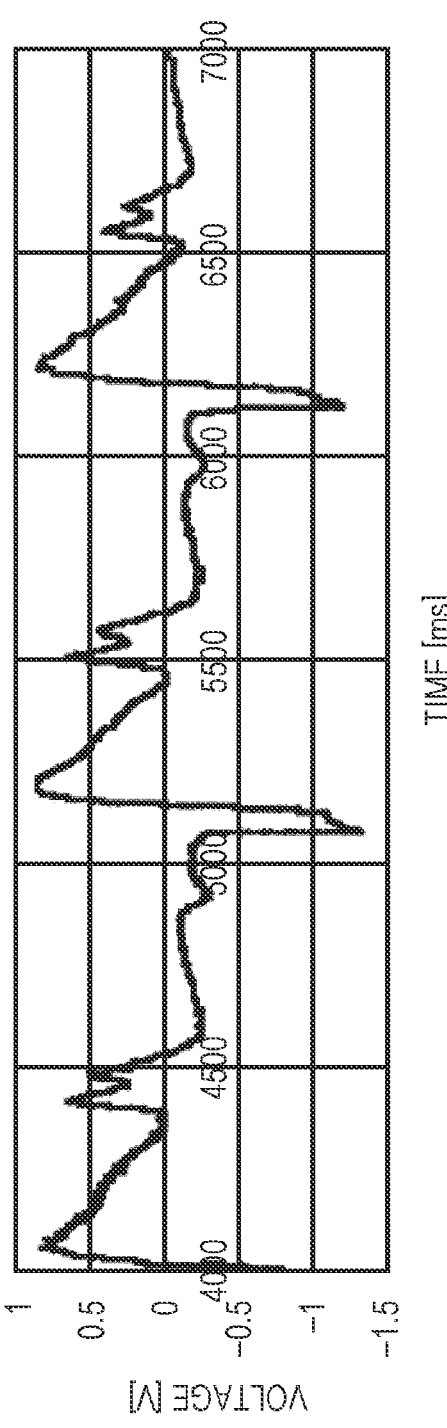
FIG. 16 is a waveform chart illustrating an example of a waveform of a voltage generated by a human body.

Moreover, when the power receiving the leakage electric field (quasi-electrostatic field) from a power transmission line under the power transmission line was measured, it was about 200 mV (p-p value). Moreover, in a case where a person walks, an electric field is generated, and a voltage waveform as illustrated in FIG. 16 can be obtained by the antenna device 1. In FIG. 16, the vertical axis represents voltage (V), and the horizontal axis represents time (msec). The antenna device 1 can take in the electric field generated during walking as energy.

Using the configuration of FIG. 2, an experiment was conducted on how much power can be taken in by actually connecting to the human body in a laboratory without a window owned by the applicant. As a result, in the laboratory, it was possible to obtain power enough to turn on the LED with power of 2 V in one minute. Furthermore, in the laboratory on a window side, it was possible to obtain power of 2 V in 20 seconds. Therefore, considering that the example described in Patent Document 1 has 100 μV in one minute, it is possible to achieve 20,000 times improvement in reception power even in a laboratory inside a room.

According to the embodiment of the present technology described above, by bringing the antenna element into contact with the human body, it is possible to take in the energy of the quasi-electrostatic field and the radio wave generated in the space, and the electric field generated in the human body during walking. If the energy taken in is rectified and stored in an energy storage device such as a secondary battery or the like, it not only extends the life of a power supply (battery) of an electronic device worn and used by a person, for example, a portable device, but also charging becomes unnecessary depending on a product.

In the present technology, the human body is a conductor, and usually exists in a state of floating with respect to the earth (GND) via an insulator such as shoes or socks. The present technology is effective in such a state. However, in daily life, even a human body floating from the earth is directly grounded to the ground which is the earth, when it moves barefoot like in the sea or a pool. Furthermore, even in a case where a handle including metal in a train is gripped, there is a possibility that the stored power is lost.

Figure 17:
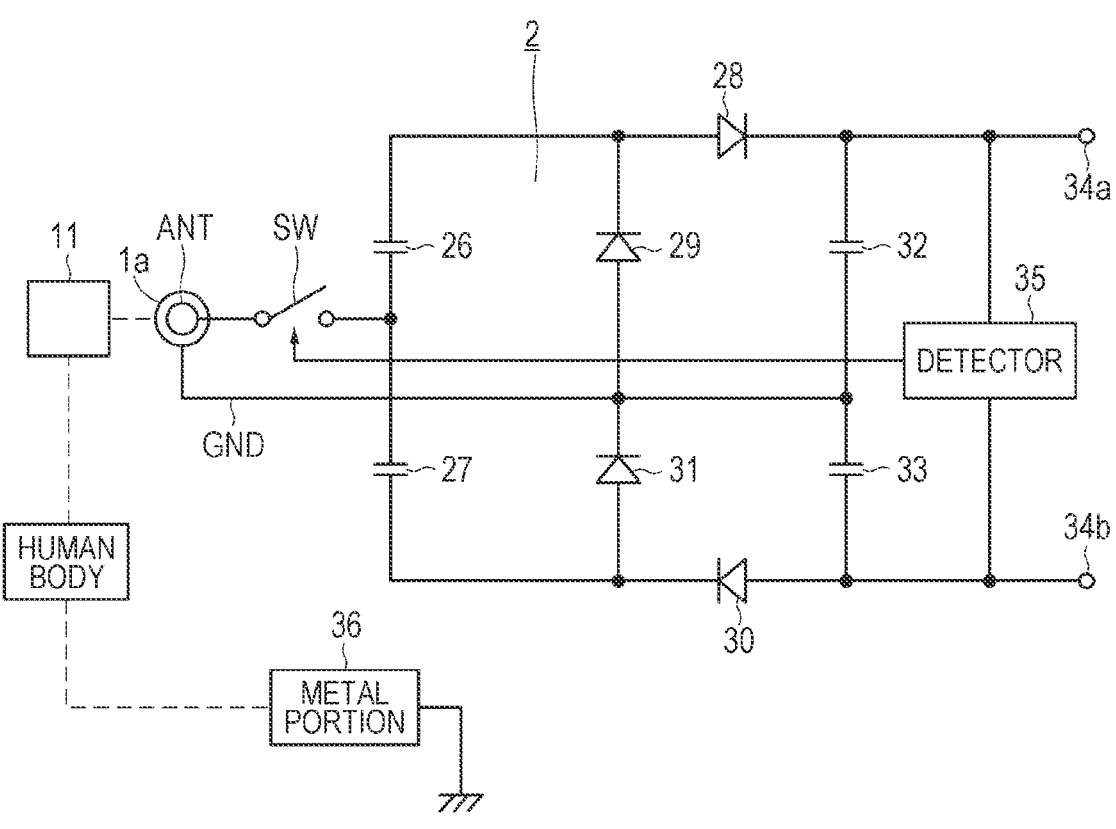
FIG. 17 is a block diagram of an embodiment of a power supply device according to the present technology.

Thus, as illustrated in FIG. 17, a configuration may be adopted in which the charge state of power is monitored constantly or at regular time intervals, and the connection with the human body is released in a case where the power is about to be lost. FIG. 17 illustrates, for example, a state in which one hand of the human body is in contact with the antenna element 11 and the other hand is in contact with a grounded metal portion 36.

A switch SW is connected between the antenna unit 1*a* and the rectifier circuit 2. A detector 35 that detects the output of the rectifier circuit 2 is provided. The ON/OFF of the switch SW is controlled by the output of the detector 35.

Figure 18:
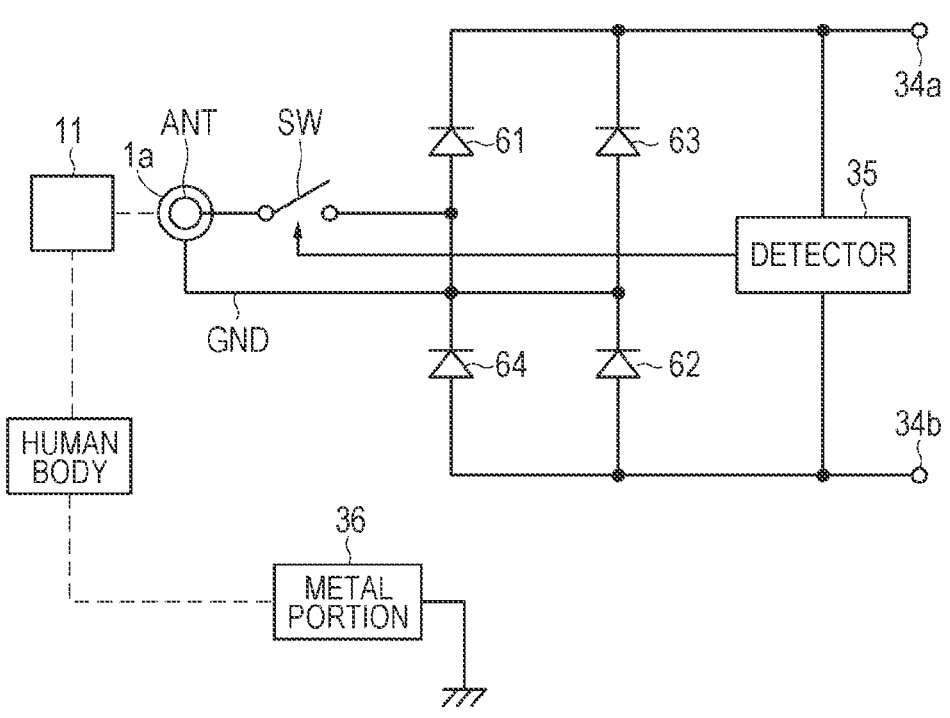
FIG. 18 is a block diagram of another embodiment of the power supply device according to the present technology.

FIG. 17 is an example of a full-wave voltage quadrupler rectifier circuit, but a configuration of a full-wave rectifier circuit as illustrated in FIG. 18 may be used. The configuration is similar to that of FIG. 8 described above, but since the switch SW is connected, it is not necessary to provide the backflow prevention diode 65. Elements corresponding to the elements in FIG. 8 are denoted by the same reference numerals, and the description thereof will be omitted.

Figure 19:
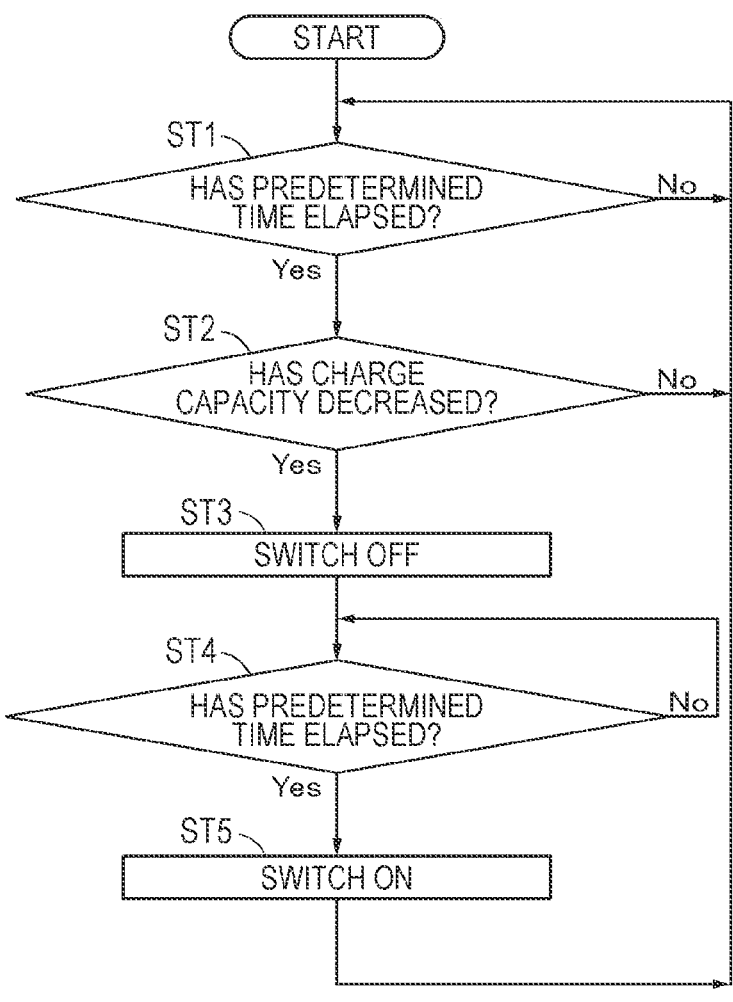
FIG. 19 is a flowchart for explaining the operation of the power supply device according to the present technology.

As illustrated in FIG. 19, in step ST1, it is determined whether a predetermined time has elapsed, and when the predetermined time has elapsed, it is determined whether the charge capacity has decreased (step ST2). When it is determined that the charge capacity has decreased, the switch SW is turned OFF (step ST3). Thereafter, when it is determined in step ST4 that the predetermined time has elapsed, the switch SW is turned on (step ST5). Then, the process returns to step ST1. With such a configuration, it is possible to prevent a decrease in charge capacity. Instead of step ST4, it may be detected that the charge capacity has reached a predetermined amount.

The present technology has a structure in which the antenna is a human body and an electric field is generated with the ground of the antenna device 1 or with a separate conductor, so that the receivable frequency is not restricted by the antenna shape. Furthermore, by adopting a structure in which the ground of the antenna device 1 or a separate conductor is capacitively coupled to the ground of the earth, it is also possible to take in electric field energy in a quasi-electrostatic field other than radio waves. That is, power or noise leaking from a power cord and an inverter can be converted into energy. In this manner, the human body is treated as a conductor, and power induced in the human body itself between the human body and the ground of the antenna device 1 can be taken in.

Figure 20A:
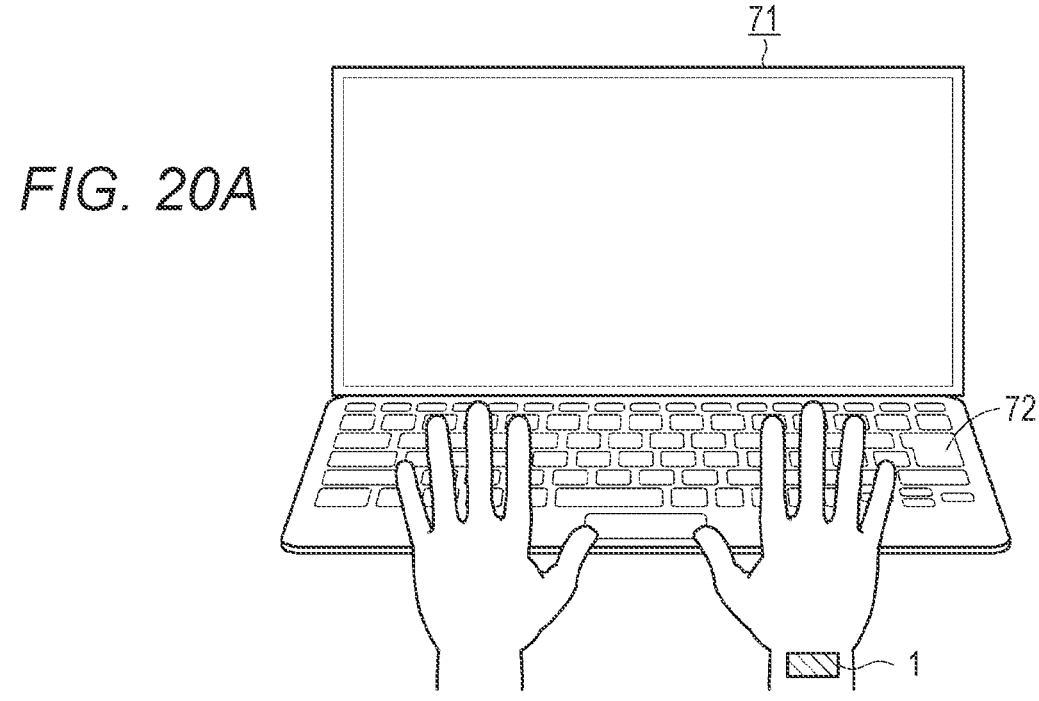
FIGS. 20A and 20B are schematic diagrams illustrating a configuration of an application example in which the present technology is applied to an operation of a notebook personal computer.
Figure 20B:
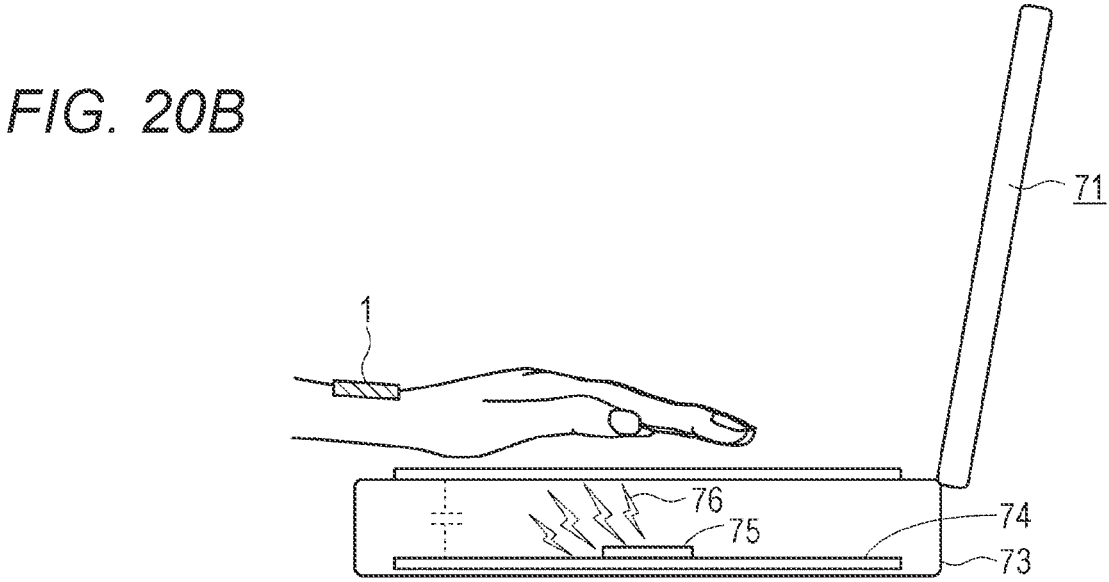

For example, as illustrated in FIGS. 20A and 20B, the antenna device 1 (hatched portion) according to the present technology is attached to the operator's wrist (or the back of the hand). A notebook personal computer 71 includes a keyboard 72, and a circuit board 74 and an electronic component 75 such as a processor and a switching power supply attached to the circuit board 74 are present in a resin case 73 on the back side of the keyboard 72. The electronic component 75 generates spatial noise 76 as indicated by arrows in FIG. 20B.

Figure 21:
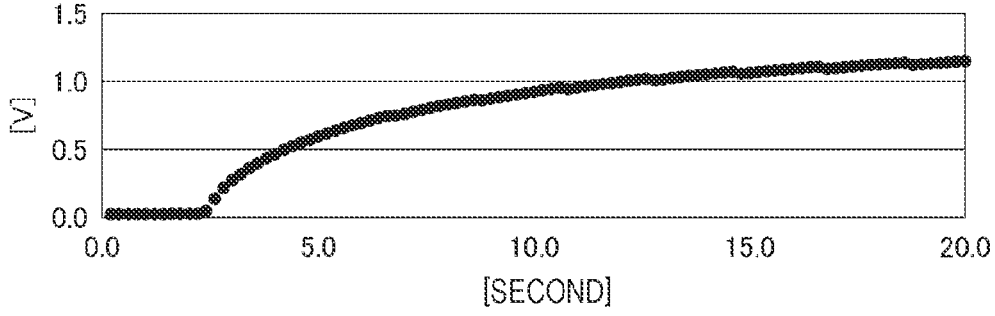
FIG. 21 is a graph illustrating an example of a voltage change obtained by the configuration of FIG. 20.

A human body (wrist in this case) is spatially coupled to the circuit board 74 of the notebook personal computer 71 and the electronic component 75 mounted on the circuit board 74 via the resin keyboard 72. Thus, in a case where the keyboard 72 is operated, the keyboard 72 and the human body come into contact with each other, and the antenna device 1 receives the components of the spatial noise 76 emitted from the circuit board 74 and the electronic component 75 via the human body. For example, in a case where the antenna device 1 includes a full-wave rectifier circuit and a capacitor (for example, 1.2 μF) is connected to a subsequent stage of the full-wave rectifier circuit, as illustrated in FIG. 21, the terminal voltage of the capacitor increases to 1.2 V in 20 seconds.

Next, as an application example of the reception device according to the embodiment and the like, the following electronic device (power supply device) is possible.

A tracker, a monitoring electronic device, a wristband-type healthcare device, a smart watch, a digital wristwatch, a wireless headphone, a wireless mouse, a hearing aid, a game remote controller, a ring-type input device, and the like are also conceivable.

Note that the tracker is a terminal that transmits position information acquired by a global positioning system (GPS) via a telephone network or the like, and displays and browses the position information on a personal computer, a tablet, or a smartphone connected via the Internet.

Figure 22:
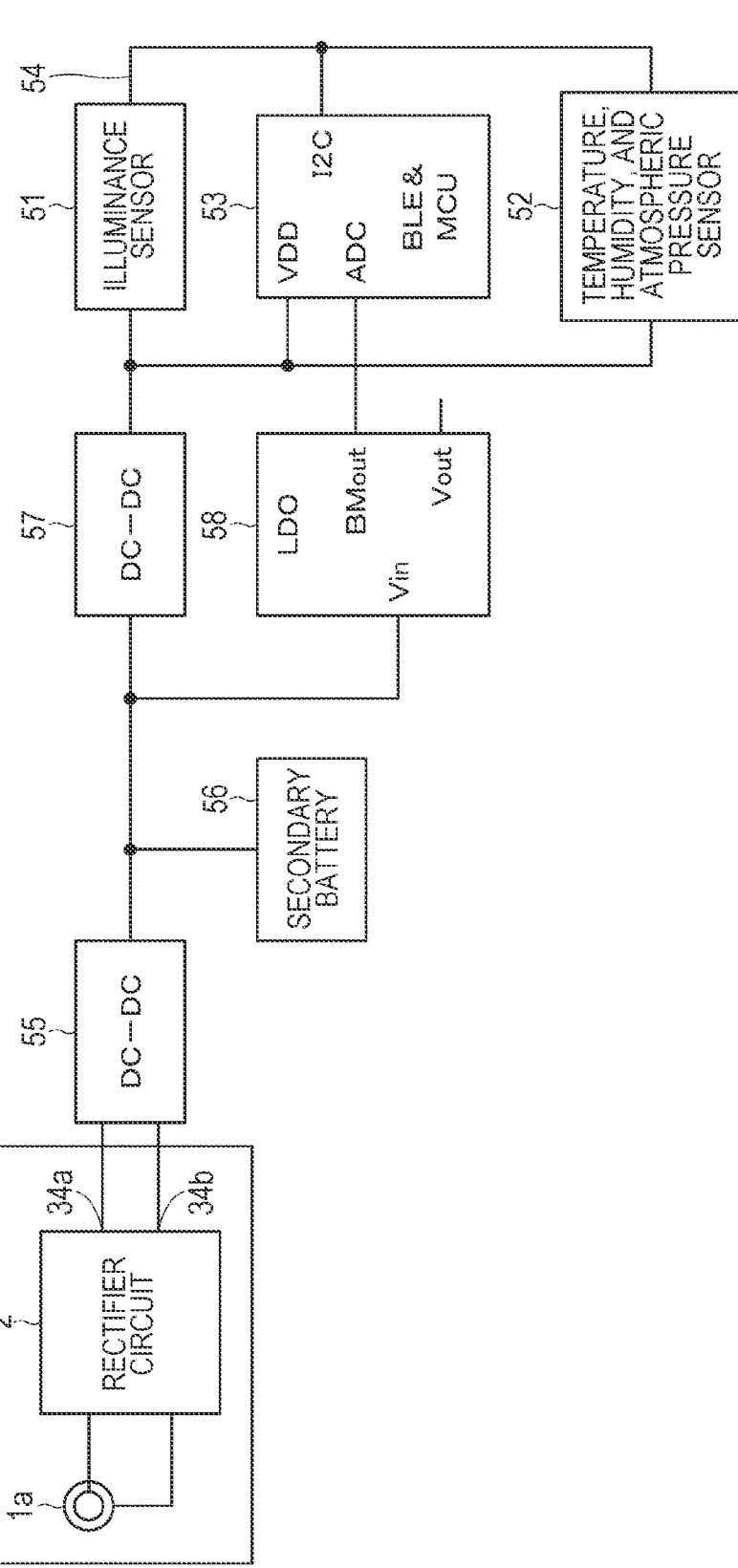
FIG. 22 is a block diagram of still another embodiment of the power supply device according to the present technology.

FIG. 22 is a block diagram illustrating an application example in which the present technology is applied to a power supply for Internet of Things (IoT) for environment monitoring. An illuminance sensor 51, a temperature, humidity, and atmospheric pressure sensor 52, and a Bluetooth (registered trademark) low energy (BLE) and Micro-controller unit (MCU) 53 are provided, and these blocks (ICs) are connected by an I2C bus 54. As a power supply for such IoT, a power supply circuit (a configuration including the antenna unit 1*a* and the rectifier circuit 2 as illustrated in FIG. 7 or 8) according to the present technology is applied. Note that, in a case where the rectifier circuit 2 is a voltage doubler rectifier circuit, it is important that the leakage current of the diode at the time of reverse bias is very small. In a case where there is a leakage current, a full-wave rectifier circuit is suitable. For the diode characteristics, it is preferably that a large amount of current can flow from a voltage at which Vf is very small. In order to obtain a high voltage, it is desirable that the leakage current of the reverse voltage application board is very small. In the case of using a voltage quadrupler circuit or the like, the leakage current at this time needs to be about 0.001 μA when 5 V of the reverse voltage is applied.

The BLE is one of extended specifications of Bluetooth (registered trademark), and can perform communication with extremely low power. Detection data of the illuminance sensor 51 and the temperature, humidity, and atmospheric pressure sensor 52 can be wirelessly transmitted to a mobile terminal such as a smartphone or a tablet, for example, by the BLE and MCU 53.

Output terminals 34*a* and 34*b* of the rectifier circuit 2 are connected to a DC-DC converter 55. A secondary battery, for example, a lithium ion secondary battery 56 is charged by the output of the DC-DC converter 55. The output of the lithium ion secondary battery 56 is supplied to a DC-DC converter 57 and a low dropout (LDO) 58.

The output of the DC-DC converter 57 is supplied as a power supply to the illuminance sensor 51, the temperature, humidity, and atmospheric pressure sensor 52, and the BLE and MCU 53. Furthermore, the output of the LDO 58 is supplied to the BLE and MCU 53 as a power supply. The LDO is a linear regulator that operates even with a low potential difference between input and output, and is designed with less energy loss and suppressed heat generation and the like by operating with a low potential difference. The output is supplied to the AD conversion input of the BLE and MCU 53, and the output voltage of the secondary battery 56 is monitored by the BLE and MCU 53.

The antenna used for communication with the outside, such as the BLE described above or the like, desirably has a dipole structure that is an antenna configuration that does not use a ground of a circuit board that is hardly affected by energy harvesting. When the power storage circuit unit described above is applied, it is also possible to charge a battery of a device that requires charging.

Note that, in a case of being used outdoors or in a pool, it is required to have waterproof and drip-proof and weather resistance to ultraviolet rays and the like. In the configuration of FIG. 2, the weather resistance of the antenna device 1 can be improved by coating the surfaces of the antenna element 11 and the case 17 or the cases 17A and 17B and the joint unit 22 in the case where the case is separated (FIG. 2C) with a resin having water resistance and light resistance.

Figure 23:
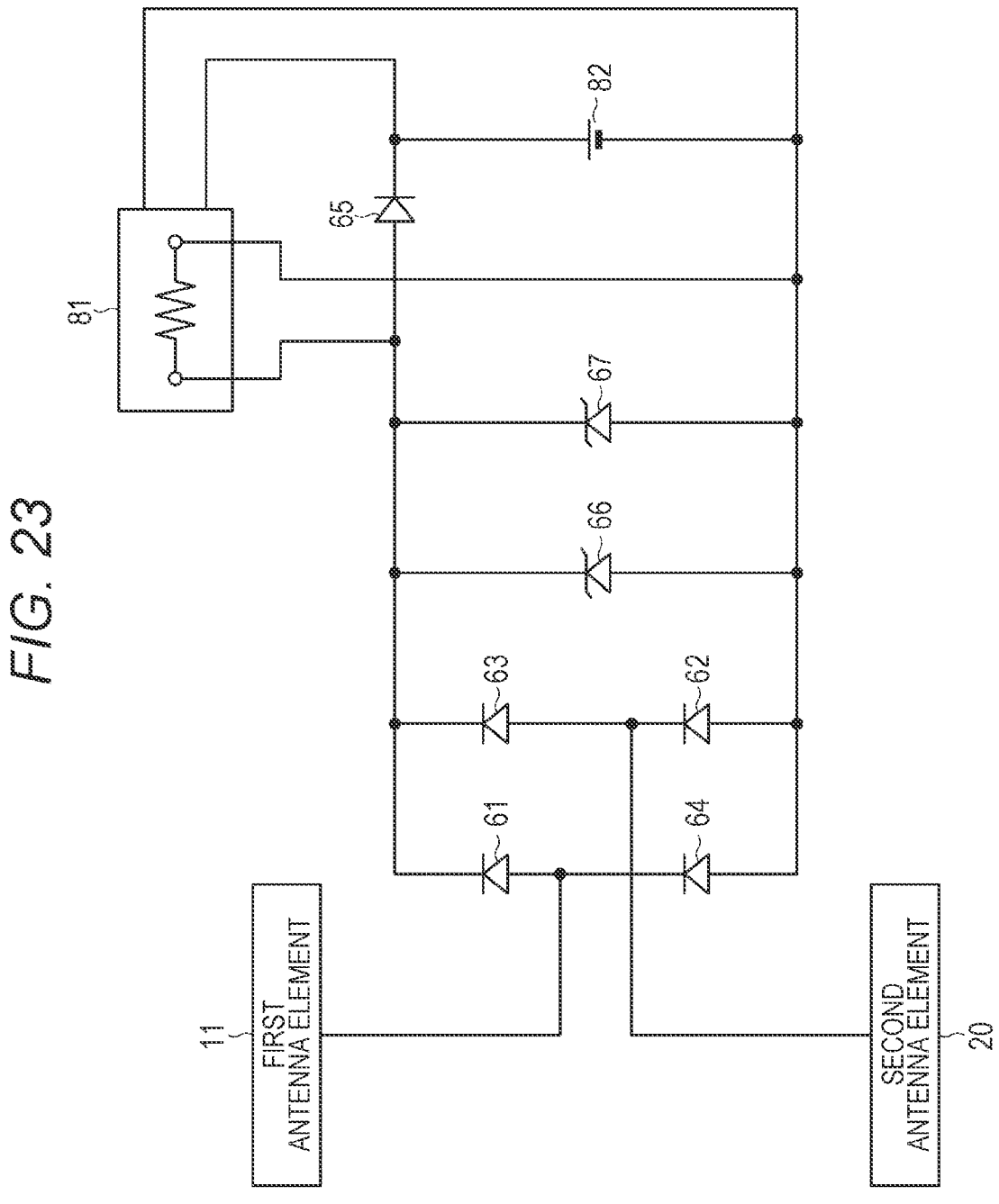
FIG. 23 is a block diagram of still another embodiment of the power supply device according to the present technology.

As described with reference to FIGS. 15 and 16, the voltage induced in a case where a person walks can be obtained by the antenna device 1. As illustrated in FIG. 23, a full-wave rectifier circuit (including diodes 61 to 64 and Zener diodes 66 and 67) is connected to the antenna device 1, and an output voltage of the full-wave rectifier circuit can be measured by a high-resistance (2 MΩ or higher, desirably 10 MΩ) sensor, for example, a voltmeter 81. Furthermore, a battery 82 is charged via a backflow prevention diode 65 by the output of the full-wave rectifier circuit, and the output of the battery 82 is used as a power supply of the voltmeter 81.

Since a voltage is generated by the spinal cord reflection of a person, the voltage variation due to walking is unique to the person (referred to as gait pattern). Thus, although not illustrated, the output of the voltmeter 81 can be analyzed by a computer or the like to perform personal authentication. Moreover, by learning the information such as the voltage variation and the physical condition, it is possible to analyze the current information, for example, the physical condition of the person wearing the antenna device 1.

Figure 24A:
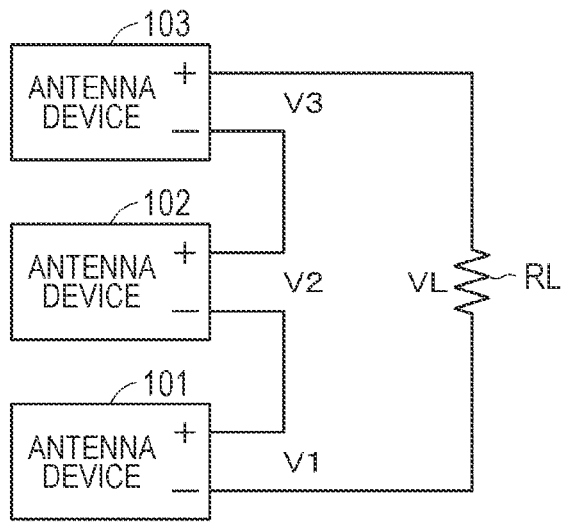
FIGS. 24A and 24B are block diagrams illustrating a general configuration for increasing output.
Figure 24B:
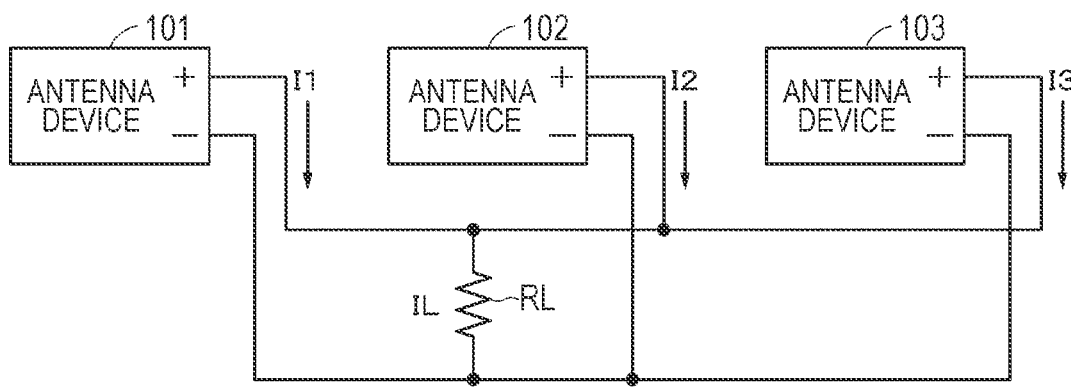

A general configuration for further increasing the output of the antenna device including the antenna unit 1a and the rectifier circuit 2 will be described with reference to FIGS. 24A and 24B. FIG. 24A illustrates a configuration in which antenna devices 101,102 and 103 are connected in series. The voltage VL applied to the load RL is (V1+V2+V3). FIG. 24B illustrates a configuration in which the antenna devices 101,102 and 103 are connected in parallel. The current IL flowing through the load RL is (I1+I2+I3).

Figure 25:
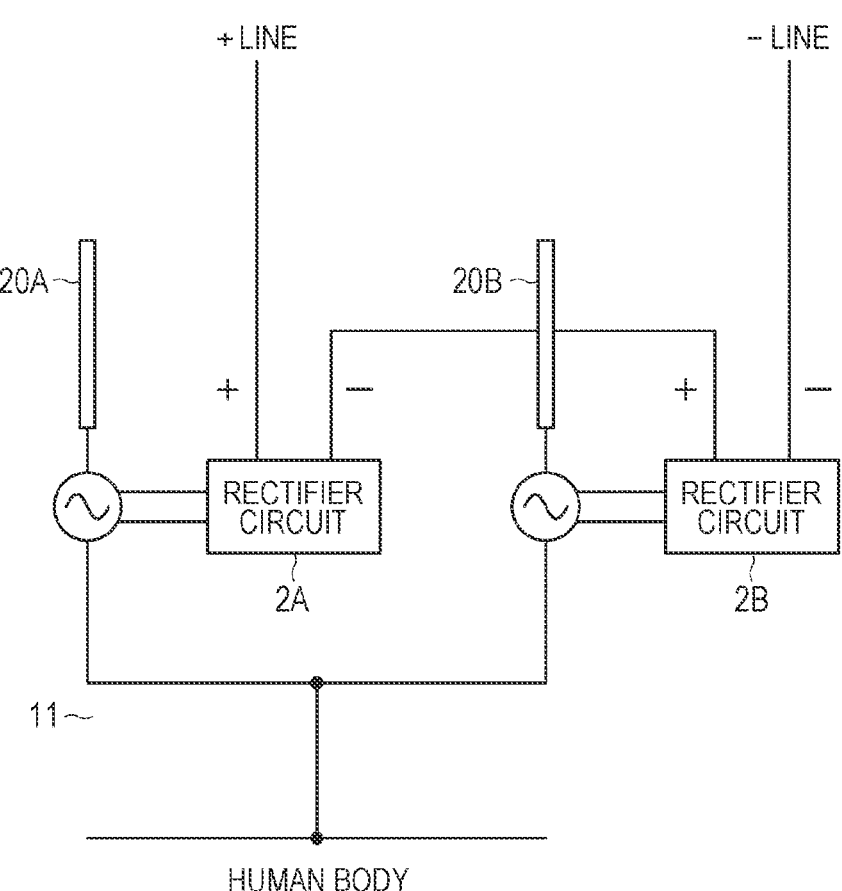
FIG. 25 is a block diagram of an example of a configuration in which antenna devices are connected in series.

FIG. 25 illustrates a first example for increasing the output voltage of the antenna device. A first antenna element 11 in contact with a human body is provided, and two second antenna elements 20A and 20B are provided with respect to the antenna element 11. The antenna elements 20A and 20B are, for example, another independent board, housing, or the like. A rectifier circuit 2A that rectifies the output of the antenna unit including the antenna elements 11 and 20A is provided, and a rectifier circuit 2B that rectifies the output of the antenna unit including the antenna elements 11 and 20B is provided. The rectifier circuits 2A and 2B are connected in series, and an output line is derived from the series connection.

Figure 26:
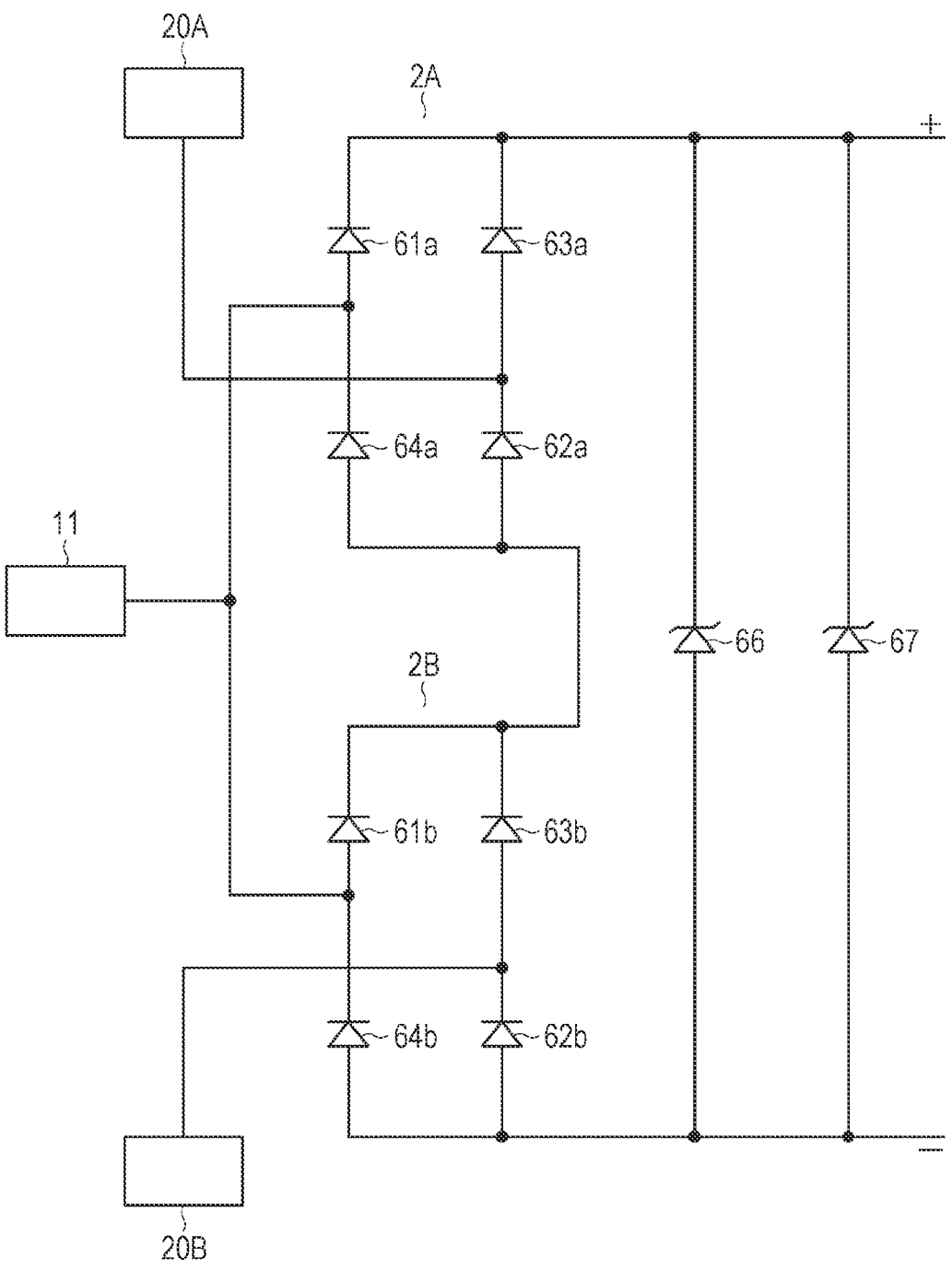
FIG. 26 is a connection diagram illustrating an example of circuit connection of FIG. 25.

FIG. 26 illustrates a circuit connection of the first example. This is an example in which a full-wave rectifier circuit is used as the rectifier circuits 2A and 2B connected in series. The Zener diodes 66 and 67 are elements common to the two rectifier circuits 2A and 2B.

According to the first example, for example, in a case where an output voltage of 4 V is obtained by one antenna device, an output voltage of 8 V can be obtained. A larger output voltage can be obtained by connecting two or more rectifier circuits in series. The first example has a configuration suitable for such a case because it is not necessary to consider a distance between antennas in a case where a frequency of power supply noise or the like that induces a voltage is low.

Figure 27:
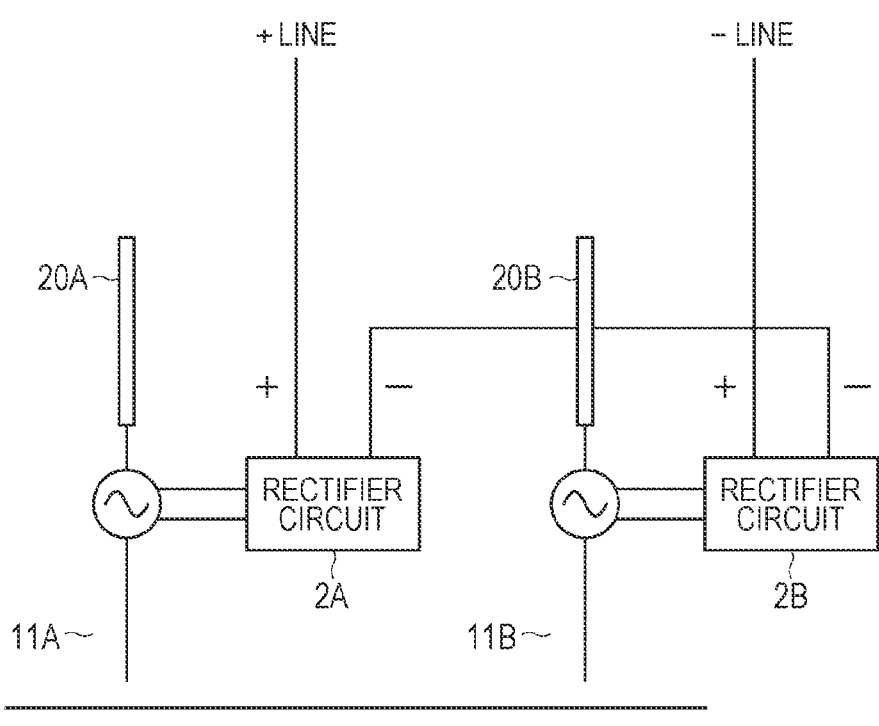
FIG. 27 is a block diagram of another example of the configuration in which the antenna devices are connected in series.
Figure 28:
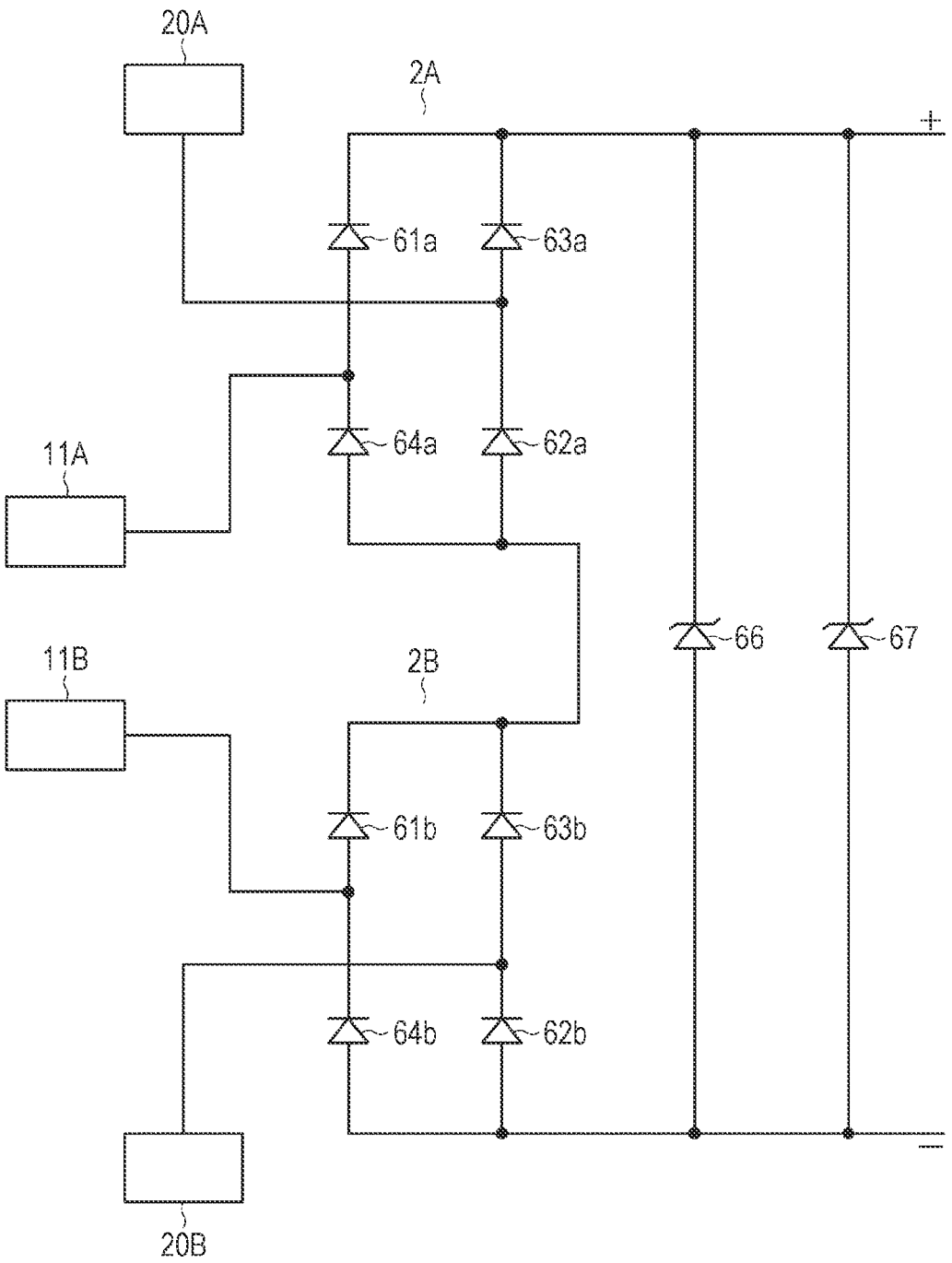
FIG. 28 is a connection diagram illustrating an example of circuit connection of FIG. 27.

In a second example, as illustrated in FIGS. 27 and 28, independent antenna elements 11A and 11B are provided as first antenna elements to be in contact with the human body. The antenna elements 11A and 11B are in contact with different parts of the human body.

FIG. 28 illustrates a circuit connection of a second example. This is an example in which a full-wave rectifier circuit is used as the rectifier circuits 2A and 2B connected in series. The Zener diodes 66 and 67 are elements common to the two rectifier circuits 2A and 2B.

Figure 29:
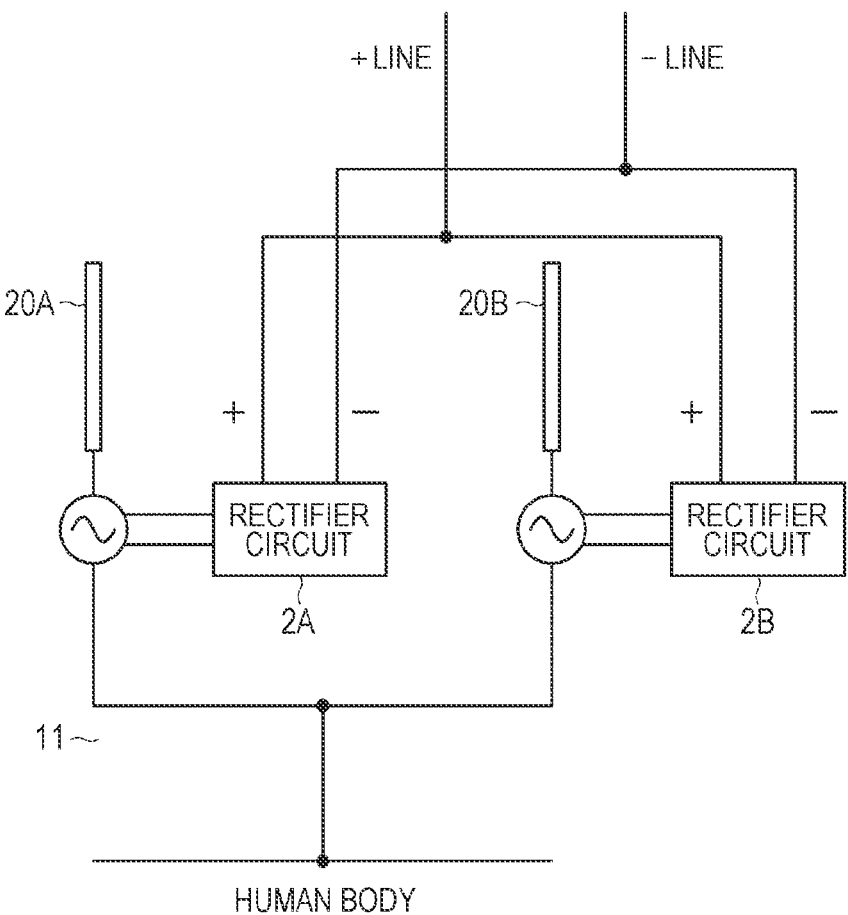
FIG. 29 is a block diagram of an example of a configuration in which antenna devices are connected in parallel.
Figure 30:
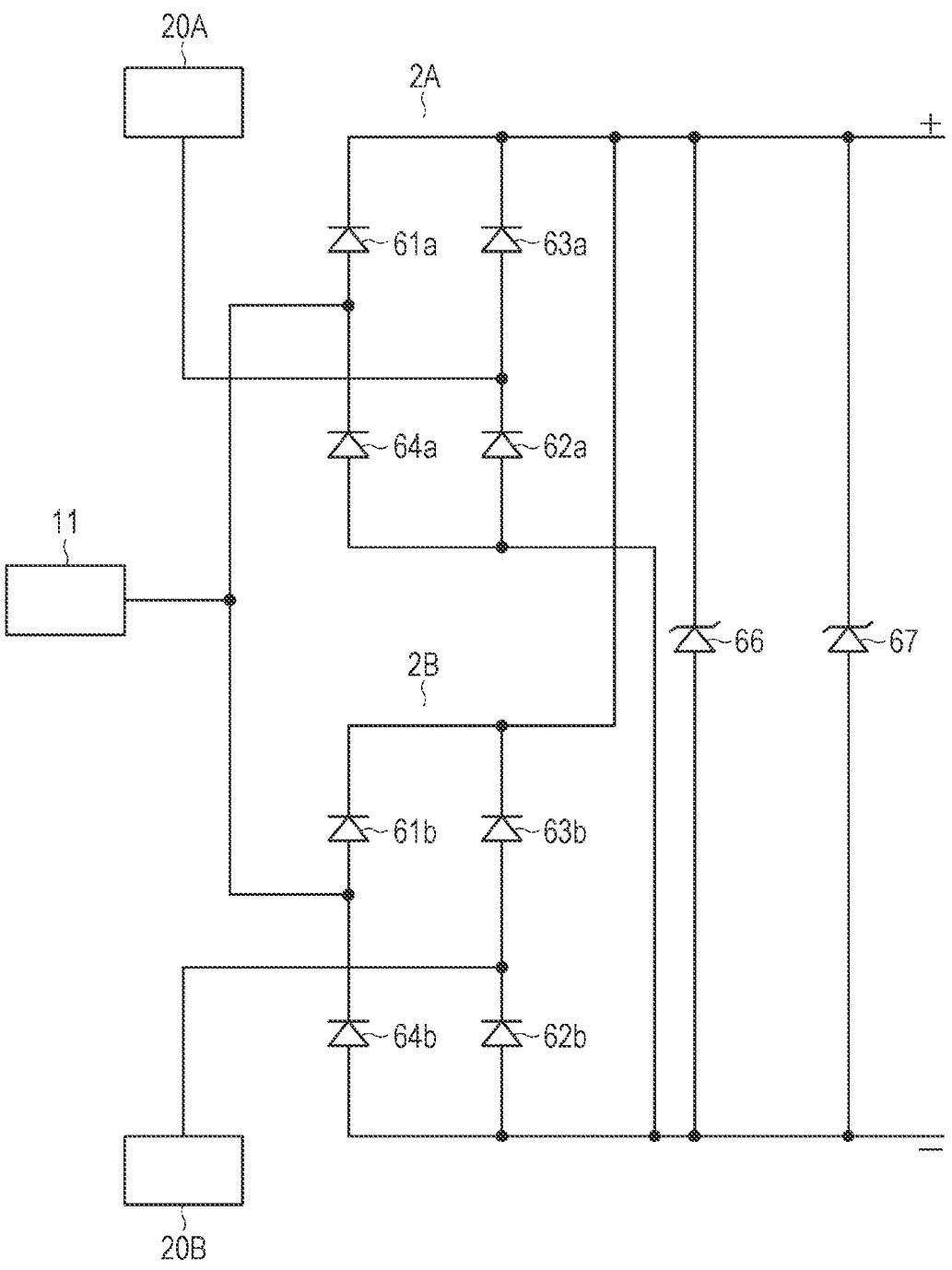
FIG. 30 is a connection diagram illustrating an example of circuit connection of FIG. 29.

FIGS. 29 and 30 illustrate a third example for increasing the output current of the antenna device. A first antenna element 11 in contact with a human body is provided, and two second antenna elements 20A and 20B are provided with respect to the antenna element 11. The antenna elements 20A and 20B are, for example, another independent board, housing, or the like. A rectifier circuit 2A that rectifies the output of the antenna unit including the antenna elements 11 and 20A is provided, and a rectifier circuit 2B that rectifies the output of the antenna unit including the antenna elements 11 and 20B is provided. The rectifier circuits 2A and 2B are connected in parallel, and an output line is derived from the parallel connection.

FIG. 30 illustrates a circuit connection of a third example. This is an example in which a full-wave rectifier circuit is used as the rectifier circuits 2A and 2B connected in parallel. The Zener diodes 66 and 67 are elements common to the two rectifier circuits 2A and 2B.

Figure 31:
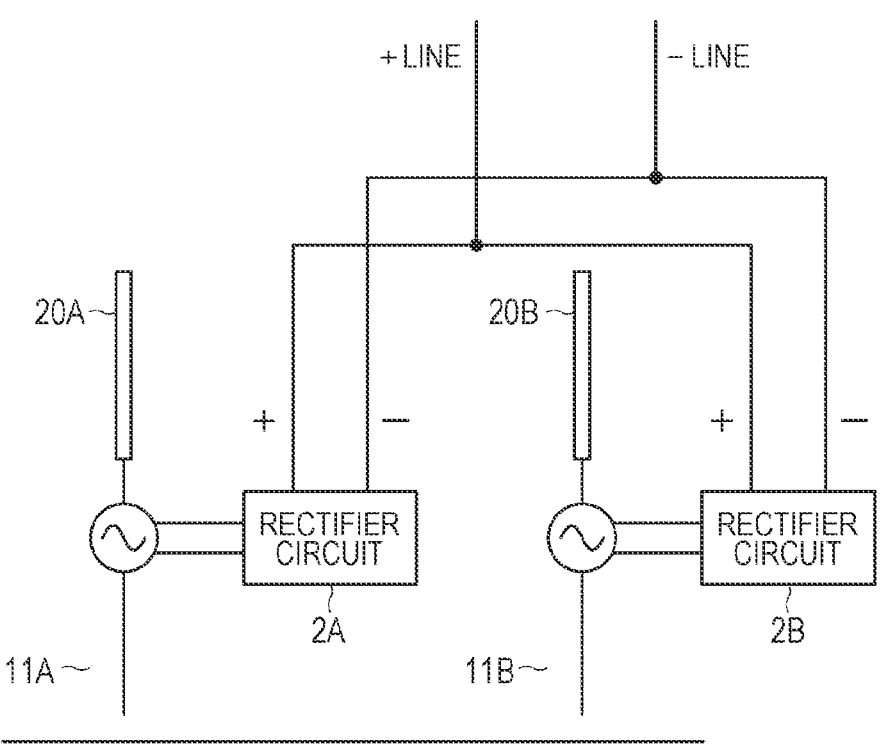
FIG. 31 is a block diagram of another example of the configuration in which the antenna devices are connected in parallel.
Figure 32:
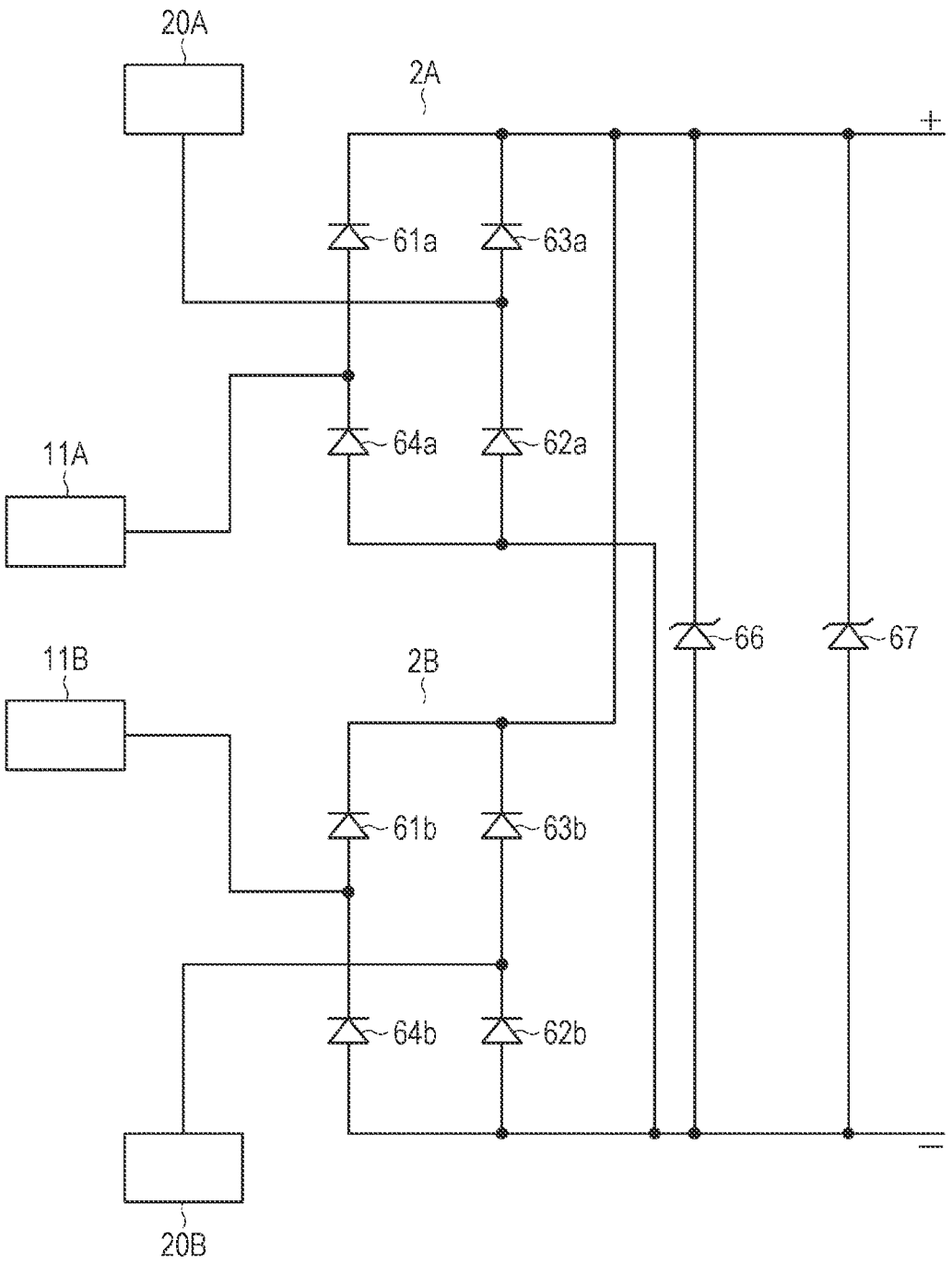
FIG. 32 is a connection diagram illustrating an example of circuit connection of FIG. 31.

In the fourth example, as illustrated in FIGS. 31 and 32, independent antenna elements 11A and 11B are provided as first antenna elements to be in contact with the human body. The antenna elements 11A and 11B are in contact with different parts of the human body.

FIG. 32 illustrates a circuit connection of a fourth example. This is an example in which a full-wave rectifier circuit is used as the rectifier circuits 2A and 2B connected in parallel. The Zener diodes 66 and 67 are elements common to the two rectifier circuits 2A and 2B.

The antenna elements 11, 11A, and 11B in contact with the human body in FIGS. 29, 30, 31, and 32 are connected to the connection point of the diodes 61a and 64a and the connection point of the diodes 61b and 64b, respectively, in order to have the same phase. Furthermore, the connection positions of the full-wave rectifier circuits are the same point.

The antenna element connected to the metal element is connected to a position at which the phases of the rectifier circuits are added in order to achieve the same phase.

15

Figure 33A:
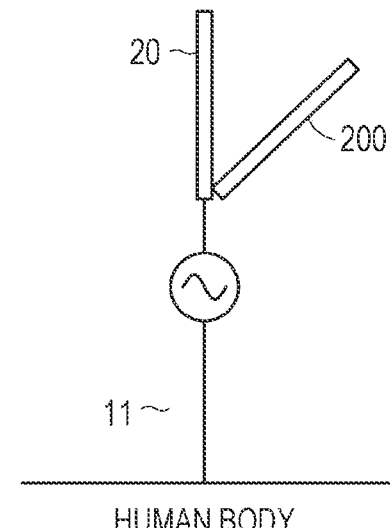
FIGS. 33A and 33B are schematic diagrams used for description in a case where the number of antennas is increased.
Figure 33B:
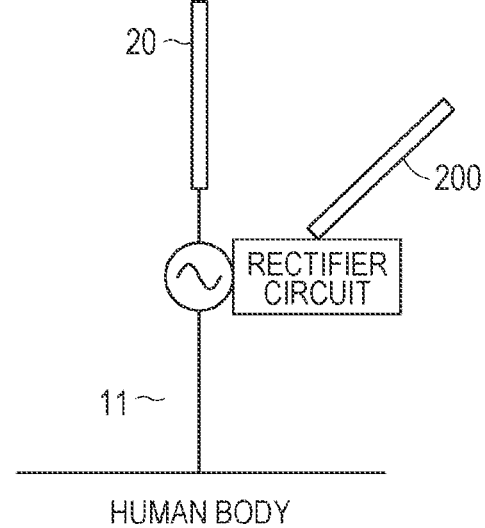
Figure 34A:
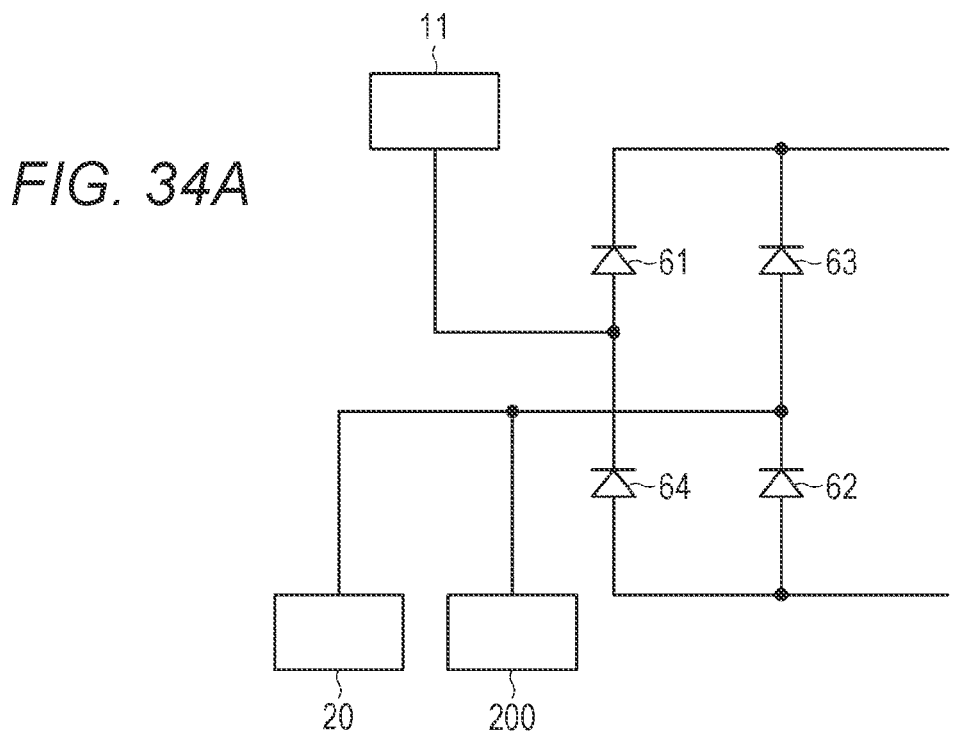
FIGS. 34A and 34B are connection diagrams used for description in a case where the number of antennas is increased.
Figure 34B:
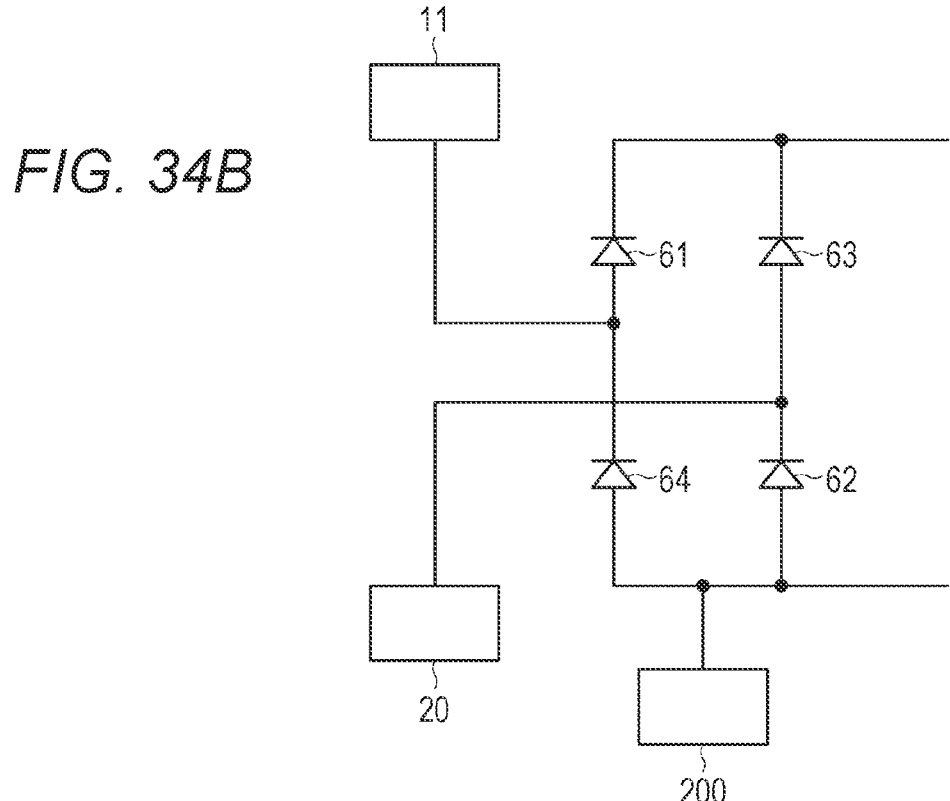

FIGS. 33A, 33B, 34A, and 34B illustrate examples in a case where the number of antennas is increased in the present technology. In a case where the number of antennas having the same length is increased, the voltage slightly decreases, but when it is desired to increase the current, the number of antenna elements may be increased. As illustrated in FIGS. 33A and 34A, the current can be increased by creating and connecting an antenna element 200 at the base of the antenna element 20. In a case where it is desired to increase the voltage and the current, the length of the antenna element is set to (length of antenna element 20<length of antenna element 200). Furthermore, as illustrated in FIGS. 33B and 34B, the antenna element 20 may be formed on a board on which a rectifier circuit is mounted, and the antenna element 200 may be separately formed by, for example, a board, a housing, a rod antenna, or the like.

As described above, in a case where an output current of, for example, 4 µA is obtained by one antenna device, an output current of 8 µA can be obtained by connecting parallel circuits. Furthermore, in a case where it is desired to increase the voltage, for example, in a case where it is desired to set the output of 4 V to the output of 8 V, it is possible by using a series circuit connection, In this manner, by combining the series and parallel circuits described above, it is possible to supply necessary power to the subsequent stage.

In the circuit configuration described above, a capacitor for smoothing a voltage after rectification may be connected in parallel to the Zener diode.

Although the embodiments of the present technology have been specifically described above, the present technology is not limited to the above-described embodiments, and various modifications based on the technical idea of the present technology can be made. Furthermore, one or a plurality of arbitrarily selected aspects can be appropriately combined. Furthermore, the configurations, methods, steps, shapes, materials, numerical values, and the like of the above-described embodiments can be combined with each other without departing from the gist of the present technology. For example, power generation using the present technology and natural energy, for example, solar power generation or a thermoelectric conversion element may be used in combination to store energy.

Furthermore, when the person wearing the antenna device touches a person other than the person himself/herself, the area of the antenna itself is increased, and the reception power is also increased. Moreover, since it is possible to store power at all times while sleeping or in other situations, it is also possible to incorporate the present receiver in a device such as a band list, for example, and charge another battery or the like directly or via a cable.

REFERENCE SIGNS LIST

1 Antenna device
2, 2*a*, 2*b* Rectifier circuit
4 Energy storage device
7 Diplexer
11 First antenna element
12 Device board
15 Feeding point
19, 20 Second antenna element
What is claimed is:
1. An antenna device, comprising:
an antenna unit including a rectifier circuit that receives electric field energy of a radio wave or a quasi-electrostatic field in a space and rectifies an AC signal into a direct current, the antenna unit including a first antenna element that is a conductor to be used in contact with a human body and a second antenna element that is a conductor different from the first antenna element and provided not to be in contact with the human body in a state where the human body is not grounded to a ground that is earth,
wherein an input line output to the rectifier circuit from the first antenna element used in contact with the human body of the AC signal output from the antenna unit is connected in series to the rectifier circuit.
2. The antenna device according to claim 1, wherein a contact surface of the first antenna element with the human body includes a conductor electrode including any one or a combination of gold, silver, aluminum, copper, iron, nickel, an alloy, a conductive resin, and a conductive rubber.
3. The antenna device according to claim 2, wherein the electrode is coated with a resin.
4. The antenna device according to claim 2, wherein the electrode has a pin shape, a hemispherical shape, an uneven shape, or a planar shape according to a shape of a device to be used.
5. The antenna device according to claim 1, wherein the second antenna element is a conductor such as copper, and includes a ground of a circuit board of a receiver, a pattern different from the ground on the board, or a conductor that is not in contact with the human body.
6. The antenna device according to claim 1, further comprising:
a separation circuit that frequency-separates the AC signal input from the antenna unit; and
a plurality of rectifier circuits that rectifies the AC signal separated by the separation circuit.
7. The antenna device according to claim 1, wherein the second antenna element and the ground of the earth are capacitively coupled to each other.
8. The antenna device according to claim 1, wherein the antenna device receives an electric field generated when a human body walks.
9. The antenna device according to claim 1, wherein a contact surface of a case to the human body other than a contact portion includes an insulating material.
10. A power supply device in the antenna device according to claim 1, the power supply device comprising a capacitance that charges power of a rectified DC waveform, the power supply device including a mechanism for charging a storage battery when a level of the capacitance becomes constant, wherein in a case where the human body touches a grounded object, the power supply device monitors a state, senses a decrease in a capacity, opens a switch provided in the antenna device, and prevents a decrease in stored power.
11. The power supply device according to claim 10, wherein the capacity is periodically checked, and connection of the switch provided in the first antenna element connected to the human body is turned on and off.
12. The antenna device according to claim 1, wherein a ratio of a forward current when a forward voltage of a diode of the rectifier circuit is applied and a reverse current when a voltage is applied in a reverse direction is at least 4700 times or more.
13. The antenna device according to claim 1, wherein a resistance value obtained using a reverse current in the rectifier circuit when 10 V is applied in a reverse direction of a diode for rectification to take in electric field energy of a radio wave or a quasi-electrostatic field (near field) in a space is 1.4 MΩ2 or more.

14. The antenna device according to claim 13, wherein the diode includes silicon.

15. The antenna device according to claim 1, wherein the antenna device includes a high-resistance sensor of 2 MΩ or more measuring the output of said rectifier circuit.

16. The antenna device according to claim 15, wherein the device analyzes data measured by the high-resistance sensor and obtains a physical condition of a human body.

17. The antenna device according to claim 15, wherein the device analyzes data measured by the high-resistance sensor and performs personal authentication.

18. The antenna device according to claim 1, wherein a plurality of instances of the antenna device are provided, and wherein the plurality of antenna devices are connected in series.

19. The antenna device according to claim 1, wherein a plurality of antenna devices according to claim 1 are provided, and wherein the plurality of antenna devices are connected in parallel.

20. An electronic device, comprising:

an antenna unit including a rectifier circuit that receives electric field energy of a radio wave or a quasi-electrostatic field (near field) in a space and rectifies an AC signal into a direct current, the antenna unit including a first antenna element that is a conductor to be used in contact with a human body and a second antenna element that is a conductor different from the first antenna element and provided not to be in contact with the human body in a state where the human body is not grounded to a ground that is earth, wherein an input line output to the rectifier circuit from the first antenna element used in contact with the human body of the AC signal output from the antenna unit is connected in series to the rectifier circuit;

an energy storage device charged by an output of the rectifier circuit; and a communication unit that uses an output of the energy storage device as a power supply.

\* \* \* \* \*